US012712122B2

(12) United States Patent
Yan et al.

(10) Patent No.: US 12,712,122 B2
(45) Date of Patent: Aug. 18, 2026

(54) TRANSFORMERS WITH SEPARATED MAGNETIC MEMBERS

(71) Applicant: TEXAS INSTRUMENTS INCORPORATED, Dallas, TX (US)

(72) Inventors: Yi Yan, Sunnyvale, CA (US); Kengo Aoya, Beppu (JP); Tomoko Noguchi, Beppu (JP); Tatsuhiro Shimizu, Beppu (JP)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 1450 days.

(21) Appl. No.: 17/002,283

(22) Filed: Aug. 25, 2020

(65) Prior Publication Data

US 2022/0068556 A1 Mar. 3, 2022

(51) Int. Cl.

| | |
|---|---|
| ***H01F 5/00*** | (2006.01) |
| ***H01F 1/04*** | (2006.01) |
| ***H01F 27/29*** | (2006.01) |
| ***H01F 27/32*** | (2006.01) |
| ***H01F 41/14*** | (2006.01) |

(52) U.S. Cl.

CPC ............. *H01F 27/324* (2013.01); *H01F 1/04* (2013.01); *H01F 27/29* (2013.01); *H01F 27/327* (2013.01); *H01F 41/14* (2013.01)

(58) Field of Classification Search

CPC ..................................................... H01F 27/324

USPC ......................................................... 336/200

See application file for complete search history.

(56) References Cited

U.S. PATENT DOCUMENTS

| | | | | |
|---|---|---|---|---|
| 6,441,715 | B1 * | 8/2002 | Johnson | H01L 28/10 336/200 |
| 7,318,269 | B2 * | 1/2008 | Yoshida | G11B 5/1274 336/200 |
| 8,513,771 | B2 * | 8/2013 | Elian | H01L 24/97 257/E29.325 |
| 8,975,612 | B2 * | 3/2015 | Hofmann | H01L 25/16 257/E29.325 |
| 11,657,951 | B2 * | 5/2023 | Tange | H01F 27/24 336/200 |
| 2011/0298088 | A1 | 12/2011 | Elian et al. | |
| 2012/0086102 | A1 | 4/2012 | Hofmann et al. | |
| 2020/0035396 | A1 * | 1/2020 | Weis | H01F 27/24 |

* cited by examiner

*Primary Examiner* — Ronald Hinson

(74) *Attorney, Agent, or Firm* — Dawn Jos; Frank D. Cimino

(57) ABSTRACT

In examples, a transformer device comprises a first magnetic member; a second magnetic member; and a substrate layer between the first and second magnetic members. The substrate layer comprises a transformer coil. The transformer device includes a third magnetic member inside the substrate layer. The transformer coil encircles the third magnetic member. The third magnetic member physically separates from the first and second magnetic members.

19 Claims, 35 Drawing Sheets

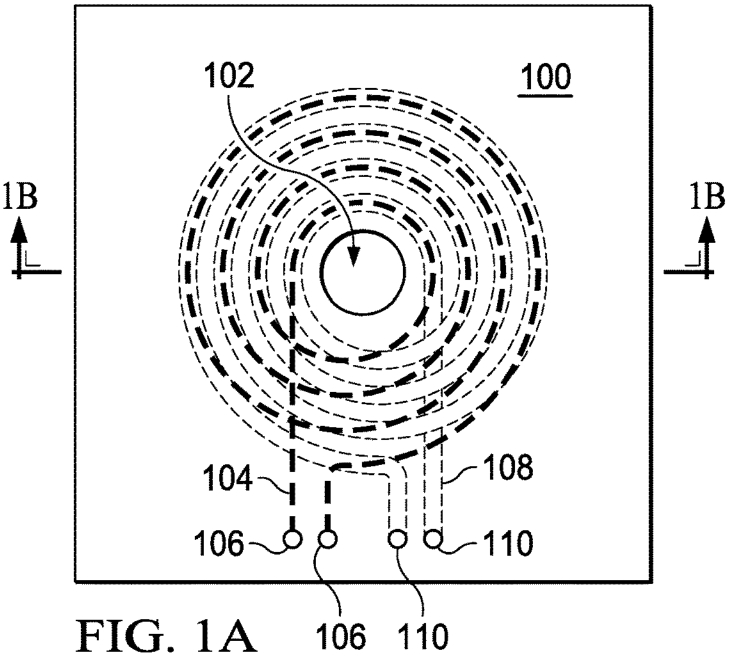
FIG. 1A
FIG. 1B
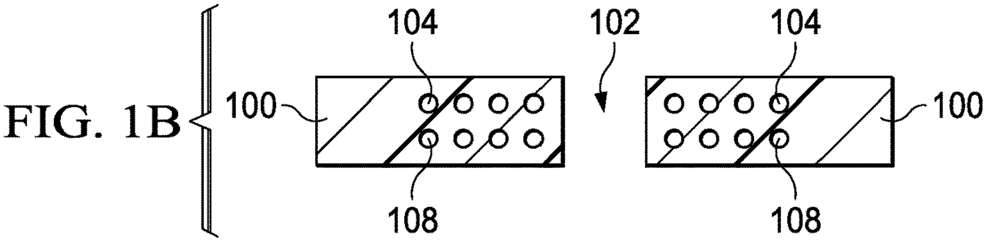
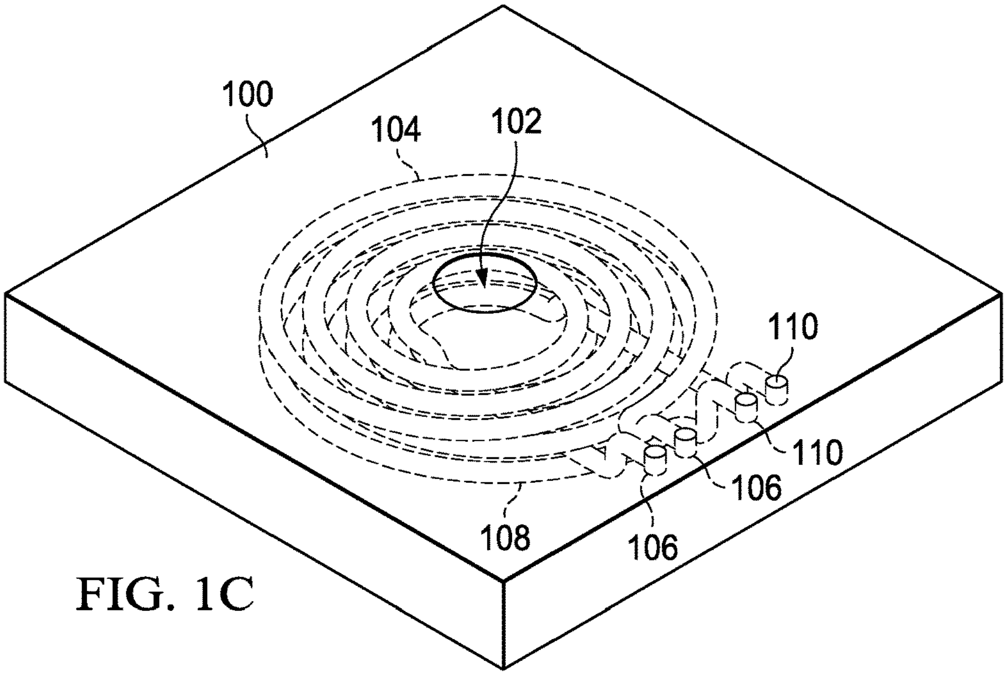
FIG. 1C

200

TRANSFORMERS WITH SEPARATED MAGNETIC MEMBERS

BACKGROUND

Transformer assemblies are housed inside packages that protect the assemblies from deleterious environmental influences, such as heat, moisture, and debris. Such transformer assemblies include transformer coils. Terminals of a transformer coil may couple to appropriate electrical connections (e.g., bond wires, lead frame leads) within the package so that the transformer assembly may be used as needed. For example, the transformer assembly may be used by a circuit formed on a semiconductor die housed in the package. Similarly, the transformer assembly may be used by a circuit in another package that is co-located on a shared printed circuit board (PCB) with the packaged transformer assembly.

SUMMARY

In examples, a transformer device comprises a first magnetic member; a second magnetic member; and a substrate layer between the first and second magnetic members. The substrate layer comprises a transformer coil. The transformer device includes a third magnetic member inside the substrate layer. The transformer coil encircles the third magnetic member. The third magnetic member physically separates from the first and second magnetic members.

BRIEF DESCRIPTION OF THE DRAWINGS

For a detailed description of various examples, reference will now be made to the accompanying drawings in which:

FIG. 1A is a top-down view of a substrate layer comprising an orifice, transformer coils encircling the orifice, and transformer coil terminals, in accordance with various examples.

FIG. 1B is a cross-sectional view of a substrate layer comprising an orifice and transformer coils encircling the orifice, in accordance with various examples.

FIG. 1C is a perspective view of a substrate layer comprising an orifice, transformer coils encircling the orifice, and transformer coil terminals, in accordance with various examples.

DETAILED DESCRIPTION

Figure 2:
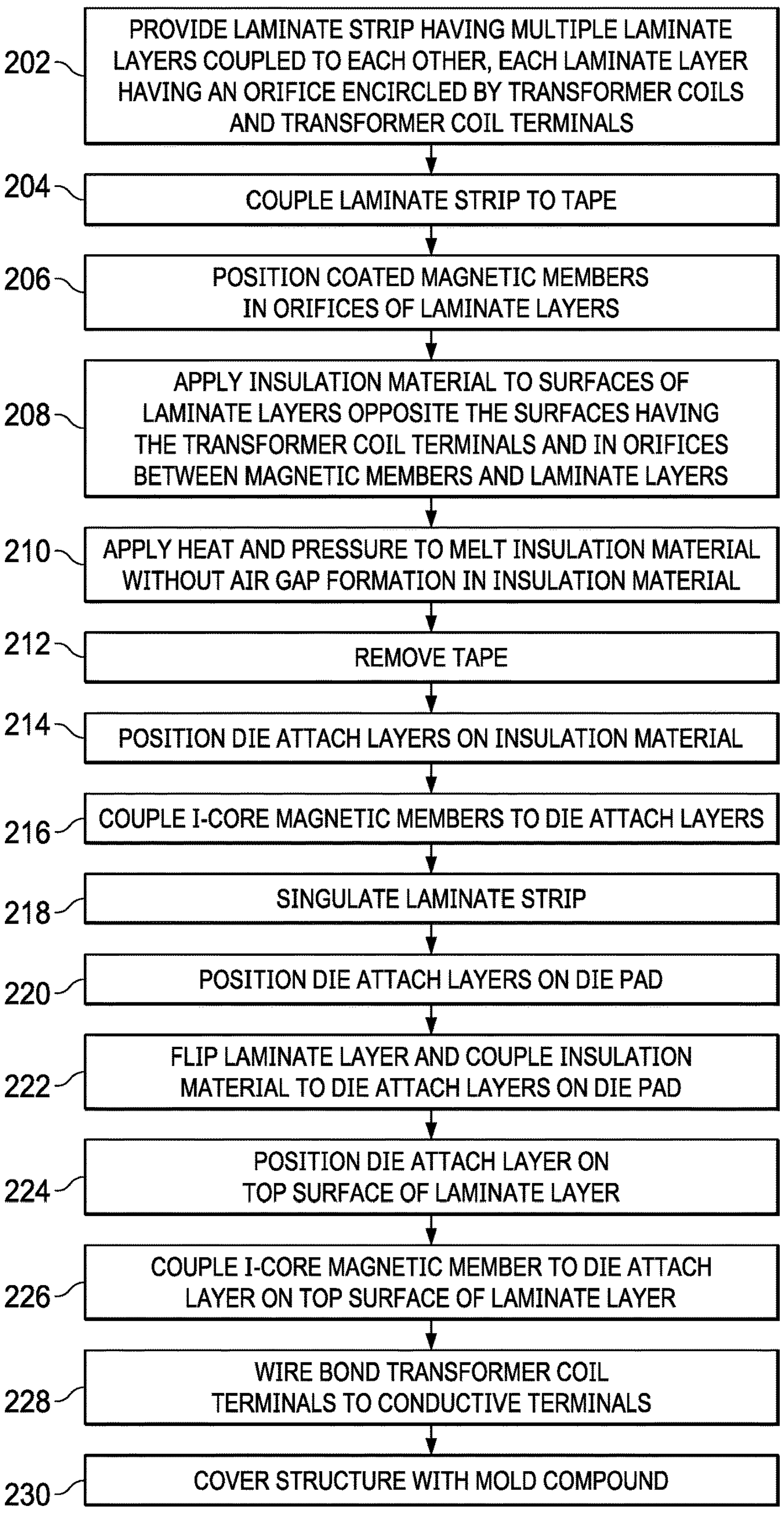
FIG. 2 is a flow diagram of a method for fabricating a transformer device, in accordance with various examples.

A magnetic member, as used herein, is the entirety of a single, physically continuous piece of metal, such as iron, zinc, or manganese. Thus, for example, two pieces of a common type of metal that are separated from each other by a different material such that the two pieces do not physically connect would not be considered a magnetic member; rather, each of the pieces of metal may be considered to be a separate magnetic member. In addition, different portions of a single, physically continuous piece of metal do not qualify as different magnetic members. For instance, different segments of an E-core (or I-core, U-core, T-core, etc.) would not qualify as different magnetic members. Unless the portions are fully detached from each other and separated by a material other than the metal of which the portions are composed, the portions are considered to constitute a single magnetic member.

Some transformer assemblies are formed using coils positioned between multiple magnetic members. Spaces within a transformer assembly, for example between the magnetic members and the coils, are filled using an appropriate adhesive material. The adhesive material provides mechanical support and moisture resistance, and it serves a variety of functional purposes (e.g., conducting current, heat dissipation). Current techniques for applying the adhesive material, however, are unsatisfactory because they leave residual air gaps (e.g., air bubbles) in spaces where adhesive material should have been deposited. This results in numerous problems, including breakdown at low voltages, which significantly affects the transformer's isolation performance. The residual air gaps also may have a negative impact on the mechanical stability and reliability of the transformer assembly. In addition, multiple curing steps may be needed to manufacture the transformer assembly, which can be time-consuming and complicated, and can substantially increase manufacturing costs.

In some cases, such transformer assemblies include a transformer coil embedded in a substrate layer. The substrate layer includes an orifice in which a magnetic member is positioned. The term orifice, as used herein, encompasses both hollow spaces in the substrate layer as well as spaces in the substrate layer that are partially or fully filled with material(s) other than the material of the substrate layer and that extend partially or fully through the substrate layer. The transformer coil of the substrate layer encircles the magnetic member when viewed from a top-down view. The substrate layer is covered by magnetic members, for example, E-core magnetic members, T-core magnetic members, U-core magnetic members, and/or I-core magnetic members. An E-core magnetic member is a magnetic member that has the form of a capital letter "E" in a top-down view; a T-core magnetic member is a magnetic member that has the form of a capital letter "T" in a top-down view; a U-core magnetic member is a magnetic member that has the form of a capital letter "U" in a top-down view; and an I-core member is a magnetic member that has the form of a capital letter "I" in a top-down view. The space between the substrate layer and the magnetic members covering the substrate layer is generally filled using adhesive material. The underfill process used to position the adhesive material in this space between the substrate layer and the magnetic members is prone to air gap formation, in large part due to the physical geometry of the substrate layer and magnetic members. For example, the viscous adhesive material may have difficulty flowing into and filling narrow openings, corners, and other complex geometries that are present between the substrate layer and the magnetic members. As a result, air gaps form, thereby introducing the various challenges described above.

This disclosure describes examples of a transformer device manufacturing process that significantly mitigates the presence of air gaps, and this disclosure also describes examples of transformer devices that may be produced using the transformer device manufacturing process. The transformer device manufacturing process is able to produce transformer devices with few or no air gaps by reducing or eliminating opportunities for adhesive material to flow through complex geometries that could cause the formation of air gaps. In particular, the process begins by positioning a magnetic member inside a coil-encircled substrate layer orifice, and using insulation material to fill areas of the orifice not filled by the magnetic member. In addition to filling at least part of the orifice, the insulation material also forms a layer along the length of the substrate layer. By positioning the insulation material in and on the substrate layer in this way before any complex geometries have been created, the possibility that air gaps will form is significantly mitigated. The process next entails positioning an adhesive layer (e.g., epoxy) on the insulation material and coupling a magnetic member, such as an I-core member, to the adhesive layer. Again, because the adhesive layer and the I-core member are positioned without any complex geometries in the way, the formation of air gaps is significantly mitigated. The process then includes flipping and mounting the structure to a platform, and another adhesive layer is positioned on the other side of the substrate layer. Another magnetic member, such as an I-core member, is positioned on this adhesive layer. As before, because this adhesive layer and magnetic member are positioned without any complex geometries in the way, air gap formation is mitigated. Wire bonds (or other connections) are formed, and the resulting structure is subsequently covered using a mold compound. The mold compound is able to easily fill the available space between the structure and the mold because it does not flow through any complex geometries, and thus the resulting transformer device (e.g., package) may contain few or no air gaps. Because the transformer device contains few or no air gaps, the aforementioned challenges associated with air gaps are mitigated. A transformer device produced using the novel manufacturing process described herein may be identified by its structure, namely, the presence of a magnetic member in a coil-encircled orifice of a substrate layer, where the magnetic member is physically separate from other magnetic members (e.g., I-core magnetic members) of the transformer device. Examples of the transformer device and its manufacture are now described with reference to the drawings.

FIG. 1A is a top-down view of an example substrate layer 100 usable in the example process flows described below. The substrate layer 100 comprises an orifice 102. In examples, the orifice 102 extends partially through the substrate layer 100. In examples, the orifice 102 extends fully through the substrate layer 100. In examples, a cross-section of the orifice 102 is circular. In examples, a cross-section of the orifice 102 is rectangular. In examples, a cross-section of the orifice 102 is irregular. Other shapes are contemplated. In examples for which the orifice 102 has a circular cross-section, such as those depicted in the drawings herein, the cross-section may have a diameter ranging from 120 microns to 150 microns. The diameter of the orifice 102 is not a mere design choice. Rather, a larger diameter may enable superior flow of insulation material filling the inside of the orifice 102 (as described below), but may also reduce the space available for the transformer coils 104, 108 (also described below), while a smaller diameter may provide increased space for the transformer coils 104, 108, but may also cause reduced flow (and thus call for higher pressure) when filling the orifice 102 with insulation material. As explained above, the term orifice, as used herein, encompasses both hollow spaces in the substrate layer 100 as well as spaces in the substrate layer 100 that are partially or fully filled with material(s) other than the material of the substrate layer 100 and that extend partially or fully through the substrate layer 100. For example, the orifice 102 in the substrate layer 100 is considered to be an orifice regardless of whether it is empty or it is partially or entirely filled by a material other than the material of the substrate layer 100.

The substrate layer 100 also comprises transformer coils 104, 108 covered by the substrate layer 100. Stated another way, the transformer coils 104, 108 are positioned inside the substrate layer 100. In examples, the transformer coils 104, 108 encircle the orifice 102 when viewed from a top-down view, as shown. The transformer coil 104 originates and terminates at transformer coil terminals 106. The transformer coil 108 originates and terminates at transformer coil terminals 110. The transformer coil terminals 106, 110 are exposed to an exterior surface of the substrate layer 100 such that they are accessible to other electronic devices, for example, via wirebonds.

The structure shown in FIG. 1A may be formed using any suitable technique. In examples, a plating (e.g., electroplating) process may be used to form the transformer coils 104, 108 and the transformer coil terminals 106, 110. In examples, the substrate layer 100 comprises a laminate material (e.g., a bismaleimide triazine (BT) or pre-preg material), in which case a lamination process is used to form the substrate layer 100. In other examples, the substrate layer 100 comprises a printed circuit board and FR-4 combination, which is a composite material composed of woven fiberglass cloth and a flame-resistant epoxy resin binder.

FIG. 1B is a cross-sectional view of the substrate layer 100 comprising the orifice 102 and the transformer coils 104, 108 encircling the orifice 102, in accordance with various examples. FIG. 1C is a perspective view of the structures of FIGS. 1A and 1B.

FIG. 2 is a flow diagram of a method 200 for fabricating a transformer device in accordance with various examples. In addition, FIGS. 3A-3C, 4A-4C, 5A-5C, 6A-6C, 7A-7C, 8A-8C, 9A-9C, 10A-10C, 11A-11C, 12A-12C, 13A-13C, 14A, and 14B depict profile, top-down, and perspective views of a process flow for fabricating a transformer device, in accordance with various examples. Accordingly, FIG. 2 is now described in tandem with the process flow of FIGS. 3A-14B.

Figure 3A:
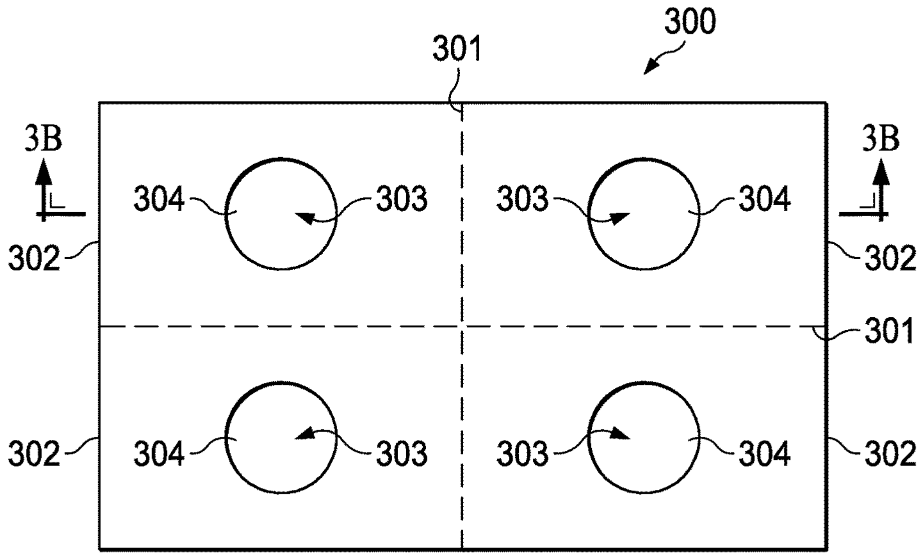
FIGS. 3A-3C, 4A-4C, 5A-5C, 6A-6C, 7A-7C, 8A-8C, 9A-9C, 10A-10C, 11A-11C, 12A-12C, 13A-13C, 14A, and 14B depict profile, top-down, and perspective views of a process flow for fabricating a transformer device, in accordance with various examples.
Figure 3B:
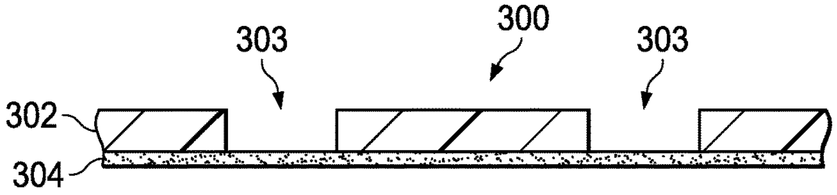
Figure 3C:
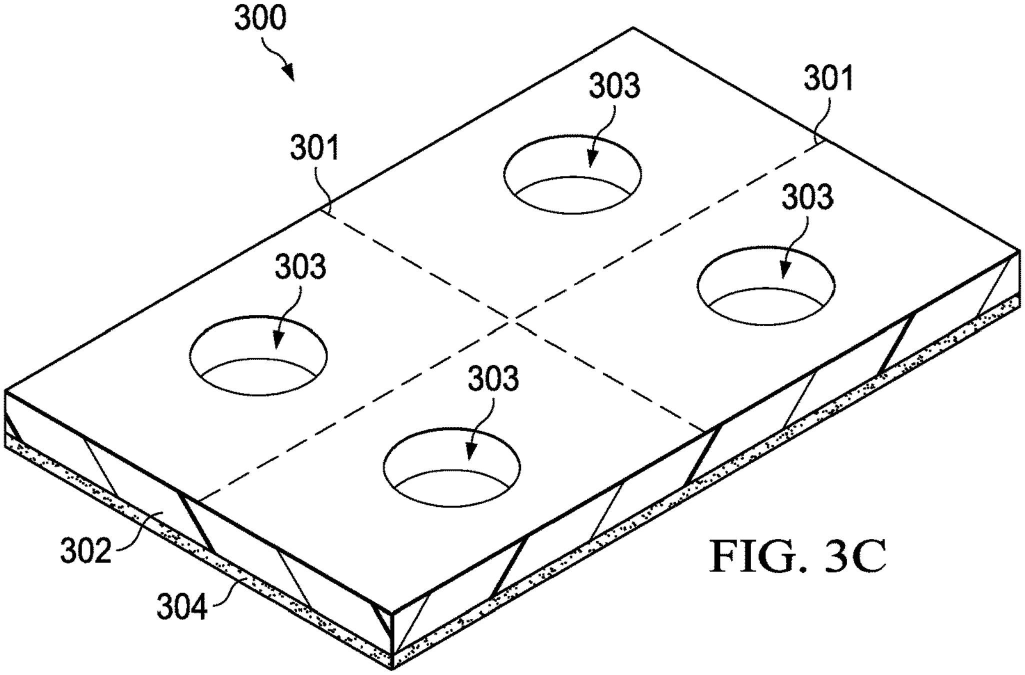

The method 200 begins with providing a substrate strip having multiple substrate layers coupled to each other, where each substrate layer has an orifice encircled by transformer coils (in a top-down view) and also has transformer coil terminals (202). The method 200 also includes coupling the substrate strip to tape (204). FIG. 3A depicts a substrate strip 300 having multiple substrate layers 302 coupled to each other. The substrate layers 302 are separable from each other by, for example, a strip dicing technique, and thus perforations 301 may separate the substrate layers 302 from each other to facilitate subsequent strip dicing. In examples, each of the substrate layers 302 is the same as the remaining substrate layers 302. In examples, a substrate layer 302 in FIG. 3A is similar or identical to the substrate layer 100 shown in FIGS. 1A-1C, and is detachably coupled to other similar or identical substrate layers 302. Because the substrate layers 302 in FIG. 3A are identical, a description given with respect to one of the substrate layers 302 herein also applies to the remaining substrate layers 302. Each substrate layer 302 in FIG. 3A includes the transformer coils 104, 108 of FIGS. 1A-1C, although the transformer coils 104, 108 are not expressly depicted in FIG. 3A and many subsequent drawings to preserve clarity of illustration. The transformer coil terminals are on surfaces of the substrate layer 302 facing downward (away from the reader). Each substrate layer 302 includes an empty orifice 303. Each of the substrate layers 302 may have a length ranging from 200 microns to 5 millimeters, a width ranging from 100 microns to 200 microns, and a thickness ranging from 100 microns to 400 microns. Substrate layer sizing is not merely a design choice; rather, larger substrate layers provide additional space for transformer coils at the expense of greater size, manufacturing time, and expense, and smaller substrate layers provide the benefits of smaller size, less manufacturing time, and less expense but at the cost of reduced transformer coil space. As shown in the cross-sectional view of FIG. 3B, a tape 304 is coupled to a bottom surface of the substrate strip 300, and this tape 304 is visible through the orifices 303 in FIG. 3A. FIG. 3C depicts a perspective view of the structures of FIGS. 3A and 3B.

Figure 4A:
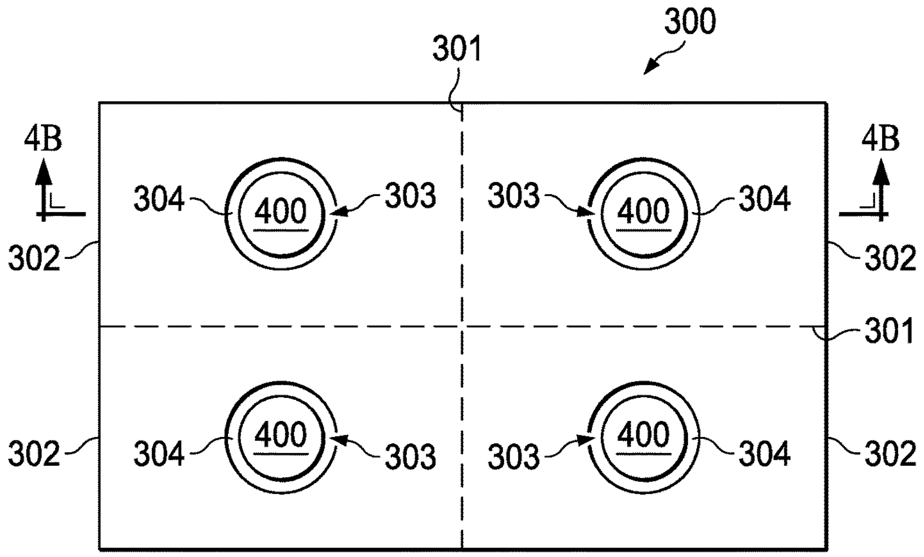
Figure 4B:
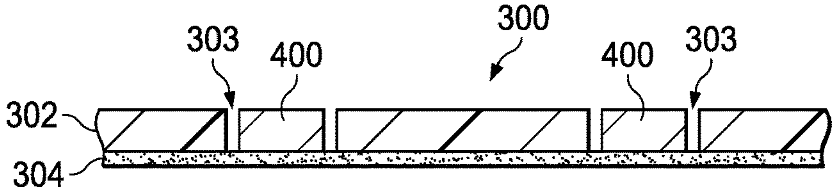
Figure 4C:
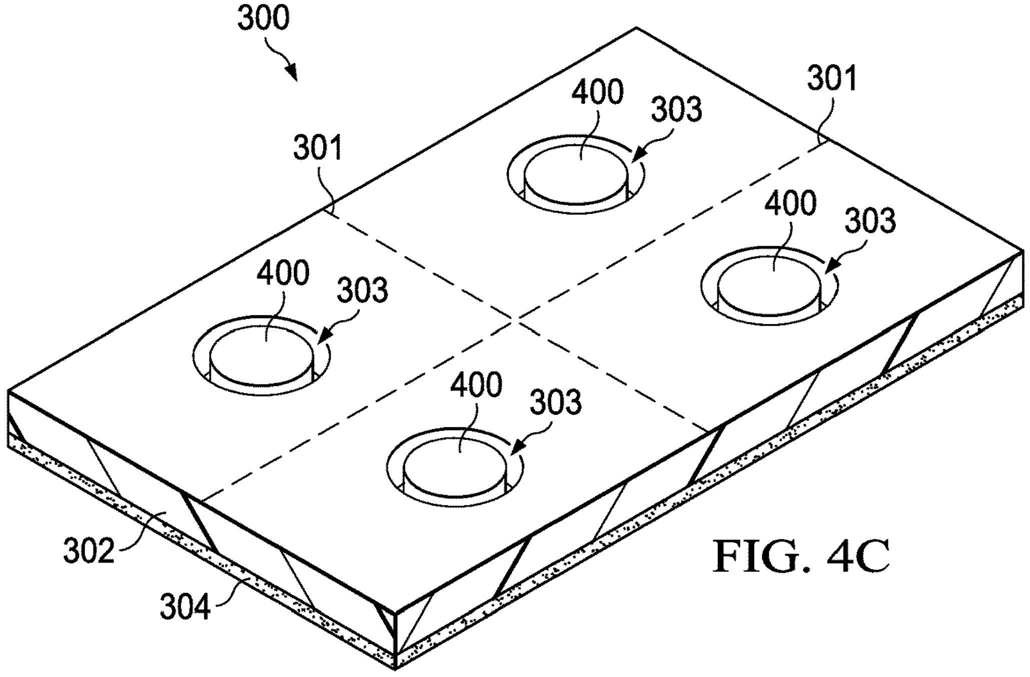

The method 200 next includes positioning coated magnetic members in the orifices of the substrate layers (206). FIG. 4A depicts a top-down view of the resulting structure, in which magnetic members 400 are positioned inside the orifices 303 of the substrate layers 302. In examples, the magnetic members 400 are solid, and in other examples, they are at least partially hollow. In examples, the magnetic members 400 are composed of a metal, such as iron, zinc, or manganese. In examples, the magnetic members 400 are coated with a material such as filling epoxy or die attach epoxy. The coating covering each of the magnetic members 400 may range in thickness from 20 microns to 50 microns, with a thicker coating providing advantages that include reduced air gap formation and disadvantages that include reduced transformer performance, and with a thinner coating providing advantages that include improved transformer performance and disadvantages that include a greater risk for air gaps (and, thus, breakdown problems). In examples, each of the magnetic members 400 (including the coating) has a diameter that is equal to or less than the diameter of each of the orifices 303. In examples, each of the magnetic members 400 (including the coating) has a diameter ranging from 100 microns to 120 microns, with a larger diameter having advantages that include improved transformer performance and drawbacks that include reduced space for insulation material (e.g., insulation material 500, described below), and with a smaller diameter having advantages that include greater space for insulation material and drawbacks that include reduced transformer performance. In examples, the magnetic members 400 (including the coating) have a thickness that is within plus or minus 5% of the thickness of the corresponding substrate layer 302 (or corresponding orifice 303). In examples, the magnetic members 400 (including the coating) have a thickness ranging from 200 micrometers to 400 micrometers. When positioned inside the orifices 303, the magnetic members 400 adhere to the tape 304. In examples, the diameters of the magnetic members 400 (including the coatings) are such that, when the magnetic members 400 are positioned inside the orifices 303, they do not fully occupy the orifices 303. FIG. 4B depicts a cross-sectional view of the structure of FIG. 4A, and FIG. 4C depicts a perspective view of the structures of FIGS. 4A and 4B.

Figure 5A:
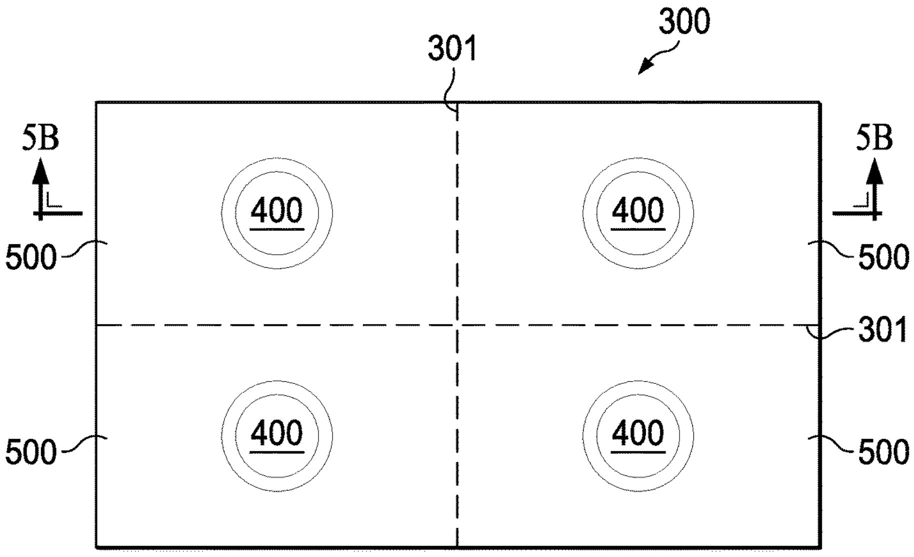
Figure 5B:
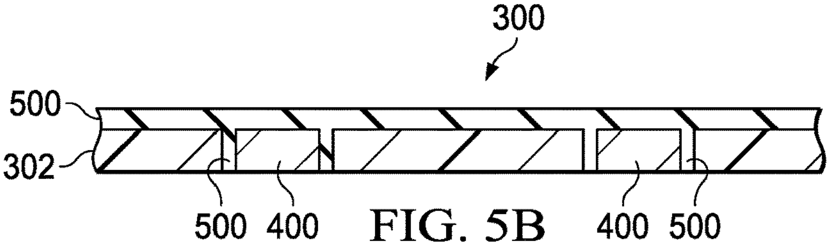
Figure 5C:
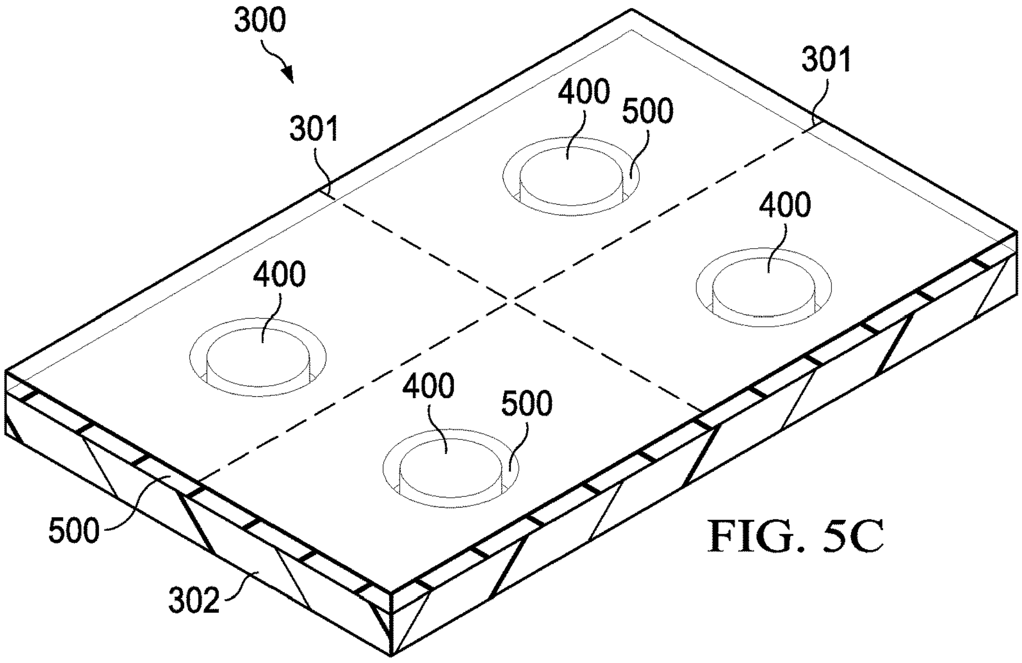

The method 200 then comprises applying insulation material to surfaces of substrate layers opposite the surfaces having the transformer coil terminals (208). The method 200 also comprises applying heat and pressure (e.g., ranging from 200 degrees Celsius to 250 degrees Celsius and 5 MPa to 10 MPa) to melt the insulation material without air gap formation in the insulation material (210), and removing the tape (212). The resulting structure is depicted in the top-down view of FIG. 5A, in which an insulation material 500 is positioned on the substrate strip 300 as shown. In addition, the insulation material 500 is positioned inside the orifices 303, for example, in between the magnetic members 400 and the substrate layers 302 (208). In examples, the insulation material 500 comprises silicon dioxide. In examples, the insulation material 500 has a horizontal thickness ranging from 15 microns to 25 microns inside the orifices 303. A thicker insulation material 500 has advantages including mitigation of air gaps and disadvantages including reduced transformer performance, while a thinner insulation material 500 has advantages including improved transformer performance and disadvantages including increased risk of air gaps. Furthermore, FIG. 5A depicts the tape 304 having been removed, because the presence of the insulation material 500 renders the tape 304 of little or no use in keeping the magnetic members 400 in place relative to the substrate strip 300. FIG. 5B depicts a cross-sectional view of the structure of FIG. 5A, and FIG. 5C depicts a perspective view of the structures of FIGS. 5A and 5B.

Figure 6A:
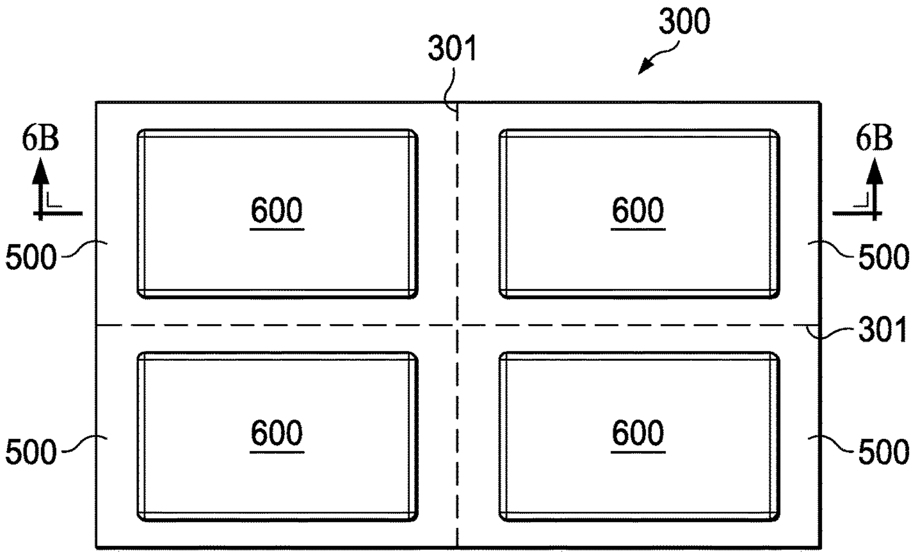
Figure 6B:
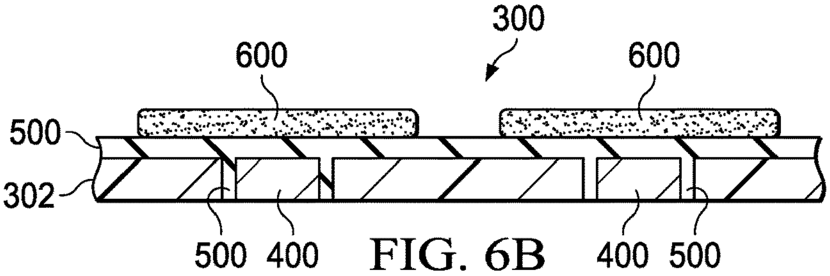
Figure 6C:
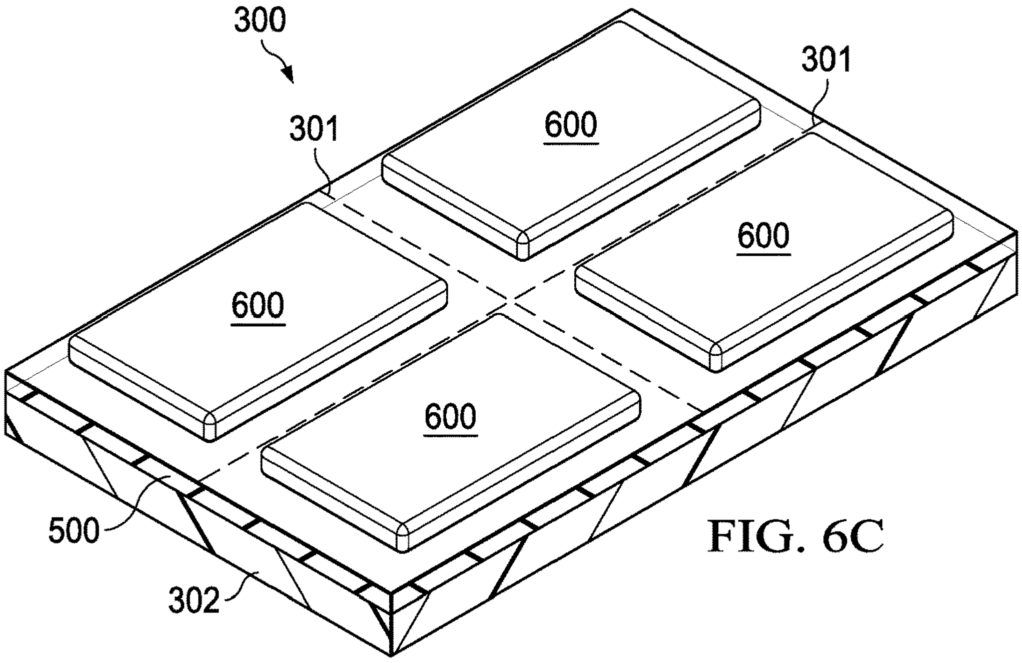

The method 200 then comprises positioning adhesive layers on the insulation material (214). FIG. 6A depicts adhesive layers 600 being positioned on the insulation material 500 above each of the substrate layers 302. The adhesive layers 600 comprise any suitable material, such as silicon dioxide. In examples, the adhesive layers 600 have thicknesses ranging from 15 microns to 25 microns. FIG. 6B depicts a cross-sectional view of the structure of FIG. 6A, and FIG. 6C depicts a perspective view of the structures of FIGS. 6A and 6B.

Figure 7A:
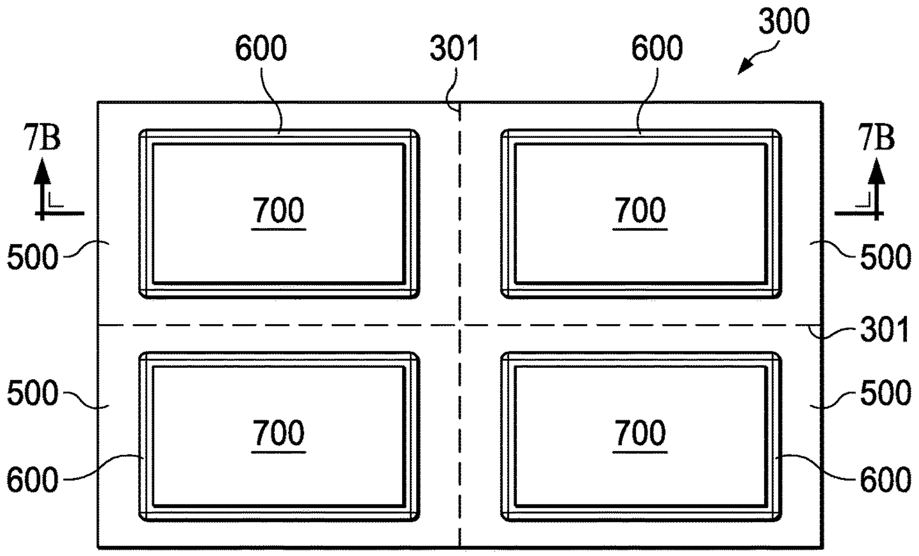
Figure 7B:
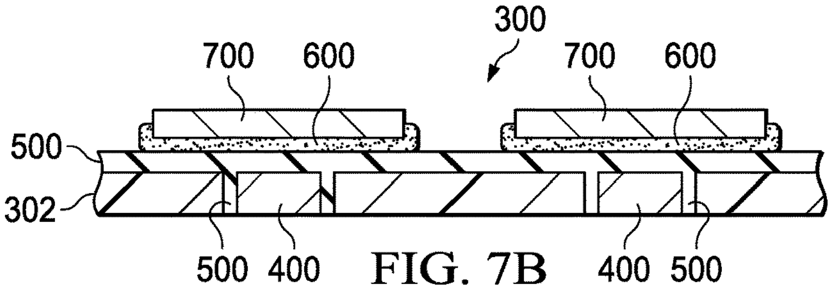
Figure 7C:
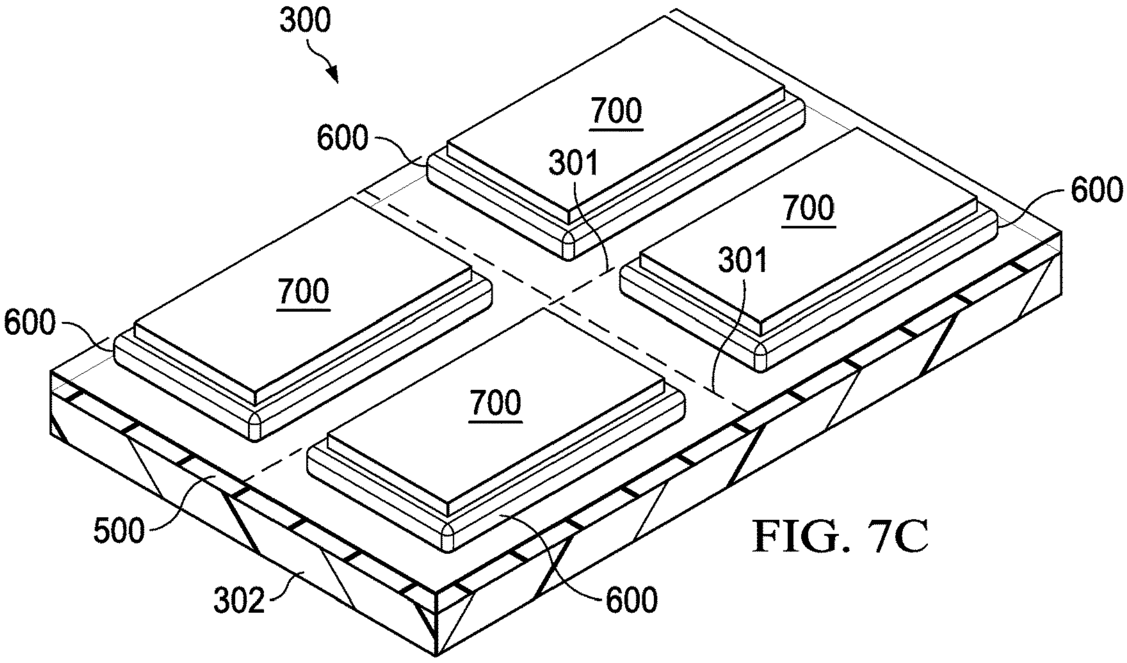

The method 200 also comprises coupling magnetic members, such as I-core magnetic members, to the adhesive layers (216). FIG. 7A depicts I-core magnetic members 700 coupled to the adhesive layers 600. In examples, the thickness of each I-core magnetic member 700 ranges from 250 microns to 300 microns. In examples, each I-core magnetic member 700 has a smaller footprint than the corresponding adhesive layer 600, where the footprint of a component refers to the length of that component multiplied by the width of that component. FIG. 7B depicts a cross-sectional view of the structure of FIG. 7A, and FIG. 7C depicts a perspective view of the structures of FIGS. 7A and 7B.

Figure 8A:
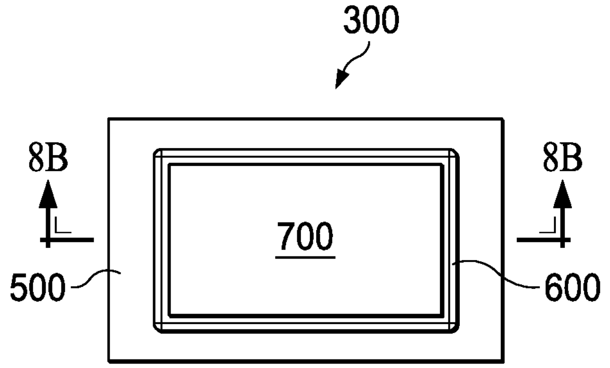
Figure 8B:
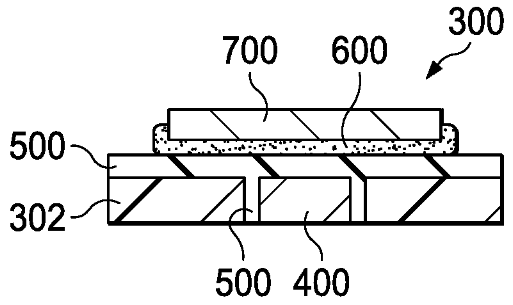
Figure 8C:
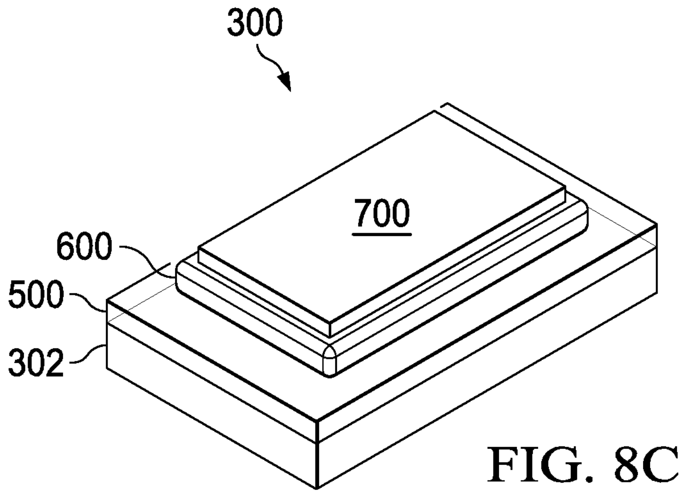

The method 200 then comprises singulating the substrate strip (218). FIG. 8A depicts a top-down view of the resulting structure, the substrate layers 302 having been separated from each other using any suitable singulation technique. Because the substrate strip 300 (e.g., FIG. 3A) includes a perforation 301, the substrate layers 302 of the substrate strip 300 may be stripped apart, for example, by pulling them apart using adequate mechanical force. Other singulation techniques are contemplated and included in the scope of this disclosure. FIG. 8B depicts a cross-sectional view of the structure of FIG. 8A, and FIG. 8C depicts a perspective view of the structures of FIGS. 8A and 8B.

Figure 9A:
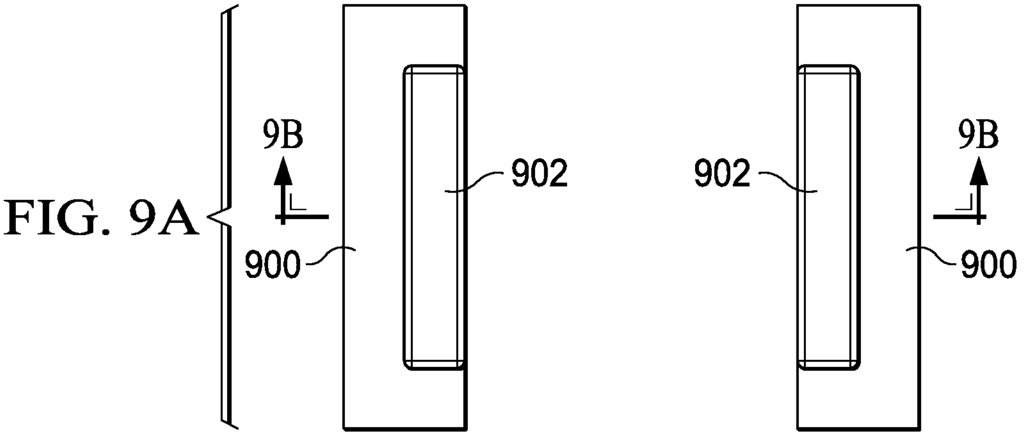
Figure 9B:
Figure 9C:
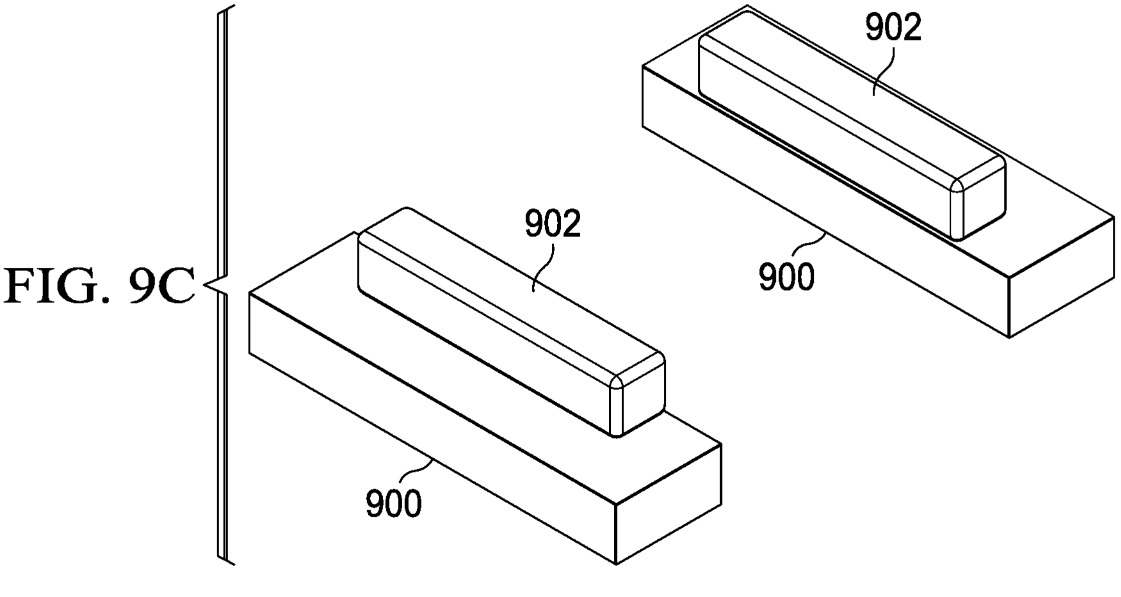

The method 200 then comprises positioning adhesive layers on a platform (220), for example, a platform of a lead frame on a lead frame strip. FIG. 9A depicts a platform 900, for example, a platform having separate members, such as may be useful in a high-voltage application. Each member of the platform 900 includes a corresponding adhesive layer 902. In examples, the widths and thicknesses of the adhesive layers 902 range from 550 microns to 600 microns and 15 microns to 25 microns, respectively. FIG. 9B depicts a cross-sectional view of the structure of FIG. 9A, and FIG. 9C depicts a perspective view of the structures of FIGS. 9A and 9B.

Figure 10A:
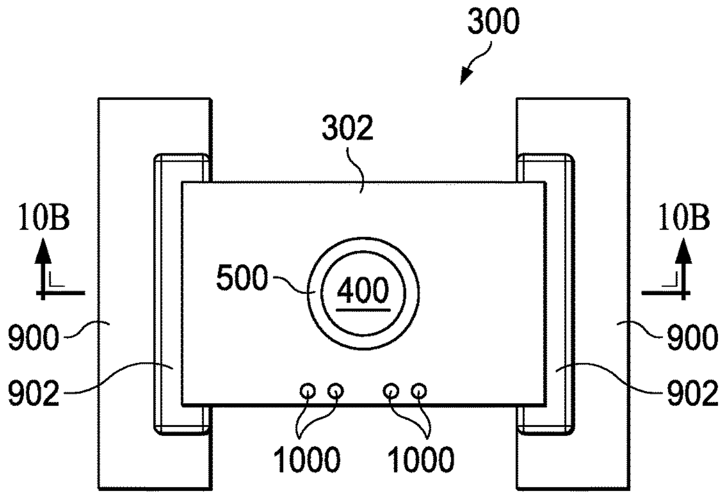
Figure 10B:
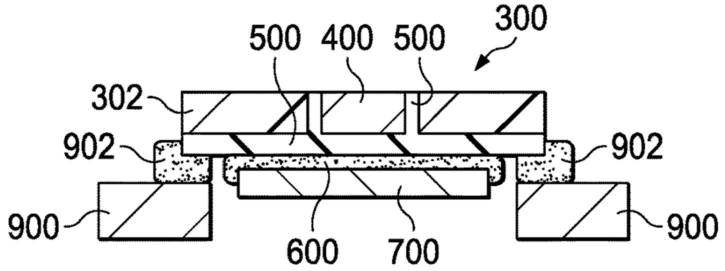
Figure 10C:
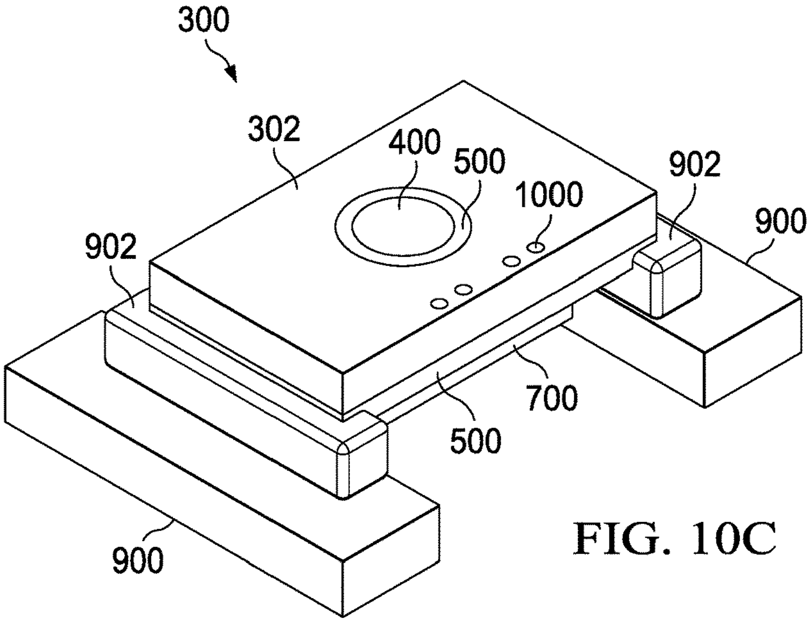

The method 200 subsequently includes flipping the substrate layer and coupling the insulation material to the adhesive layer on the platform (222). FIG. 10A depicts the substrate layer 302 having been flipped upside down so that transformer coil terminals 1000 are facing upward. As the cross-sectional view of FIG. 10B shows, the insulation material 500 couples to the adhesive layers 902. FIG. 10C depicts a perspective view of the structures of FIGS. 10A and 10B. As previously mentioned, the substrate layer 302/100 includes a laminate material (e.g., a bismaleimide triazine (BT) or pre-preg material) and the insulation material 500 contacts the laminate material of the substrate layer 302.

Figure 11A:
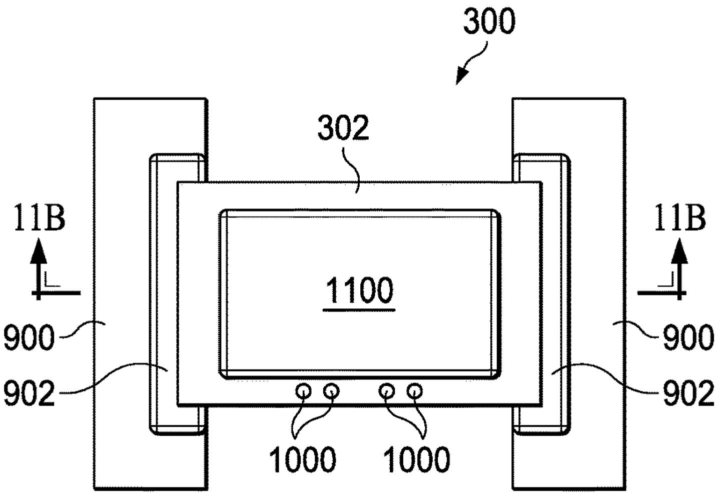
Figure 11B:
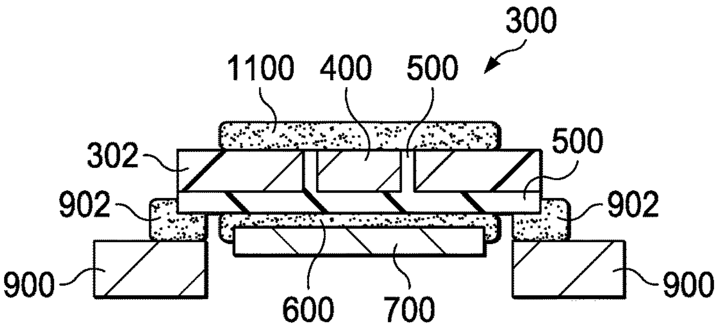
Figure 11C:
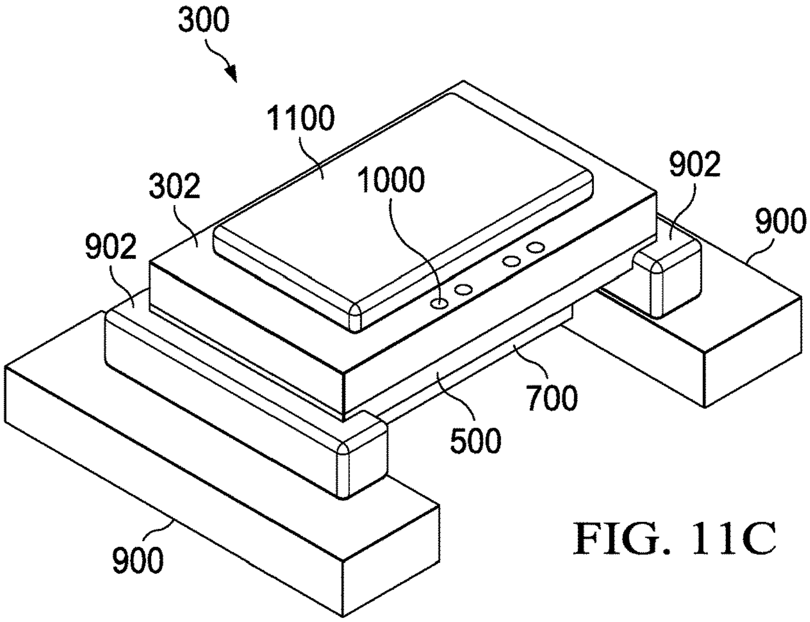

The method 200 further comprises positioning an adhesive layer on the top surface of the substrate layer (224). FIG. 11A depicts an adhesive layer 1100 positioned on a top surface of the substrate layer 302. In examples, the adhesive layer 1100 does not cover the transformer coil terminals 1000, so that the transformer coil terminals 1000 remain accessible. In examples, the adhesive layer 1100 has a thickness ranging from 250 microns to 300 microns. FIG. 11B depicts a cross-sectional view of the structure of FIG. 11A, and FIG. 11C depicts a perspective view of the structures of FIGS. 11A and 11B.

Figure 12A:
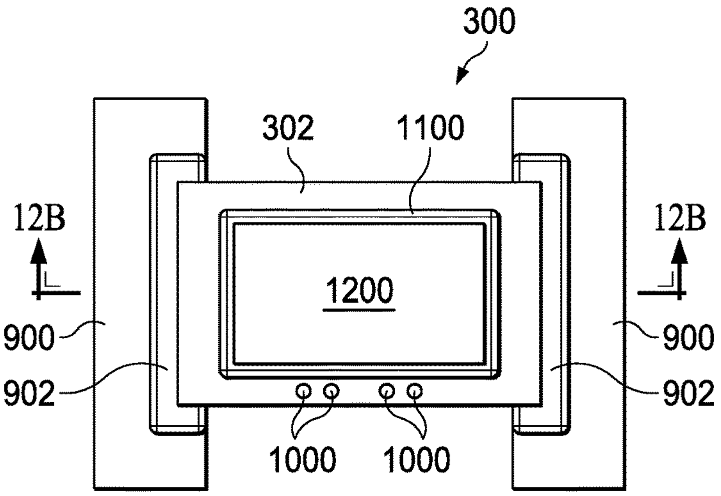
Figure 12B:
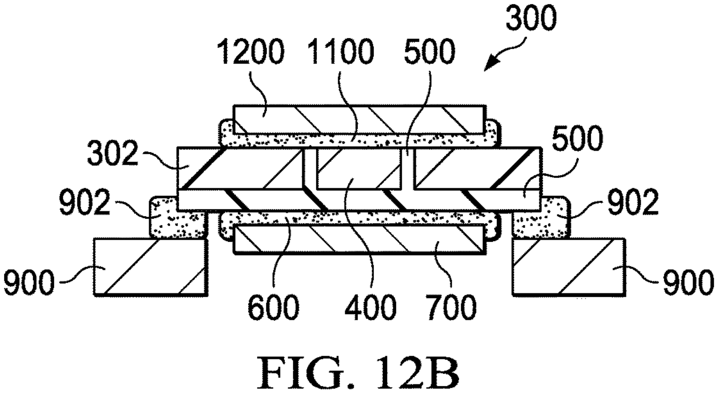
Figure 12C:
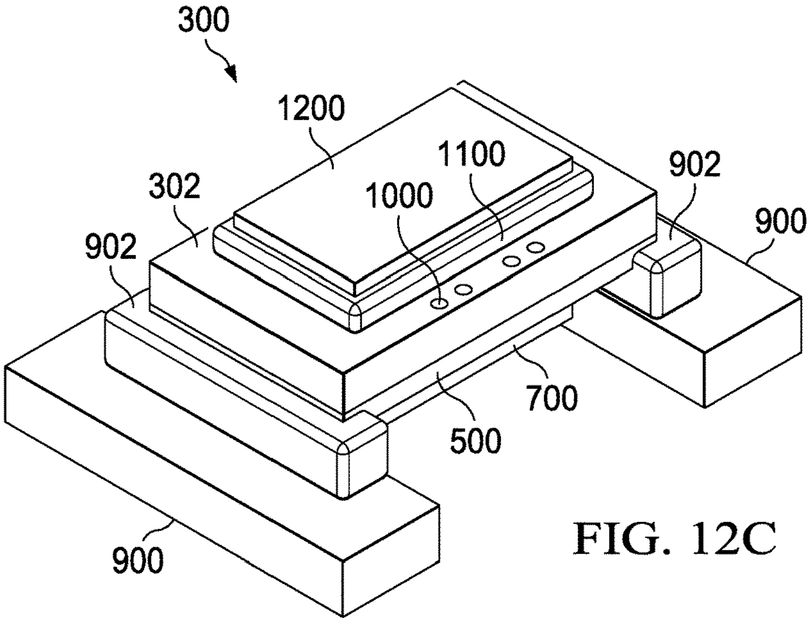

The method 200 then comprises coupling a magnetic member, such as an I-core magnetic member, to the adhesive layer that is on the top surface of the substrate layer (226), for example using a die attach reflow process. FIG. 12A depicts an I-core magnetic member 1200 positioned on the adhesive layer 1100. In examples, the I-core magnetic member 1200 is sized similarly to the I-core magnetic member 700. Sizing the I-core magnetic member 1200 to be larger or smaller brings the same advantages and disadvantages that come with sizing the I-core magnetic member 700 in the same manner. FIG. 12B depicts a cross-sectional view of the structure of FIG. 12A, and FIG. 12C depicts a perspective view of the structures of FIGS. 12A and 12B.

Figure 13A:
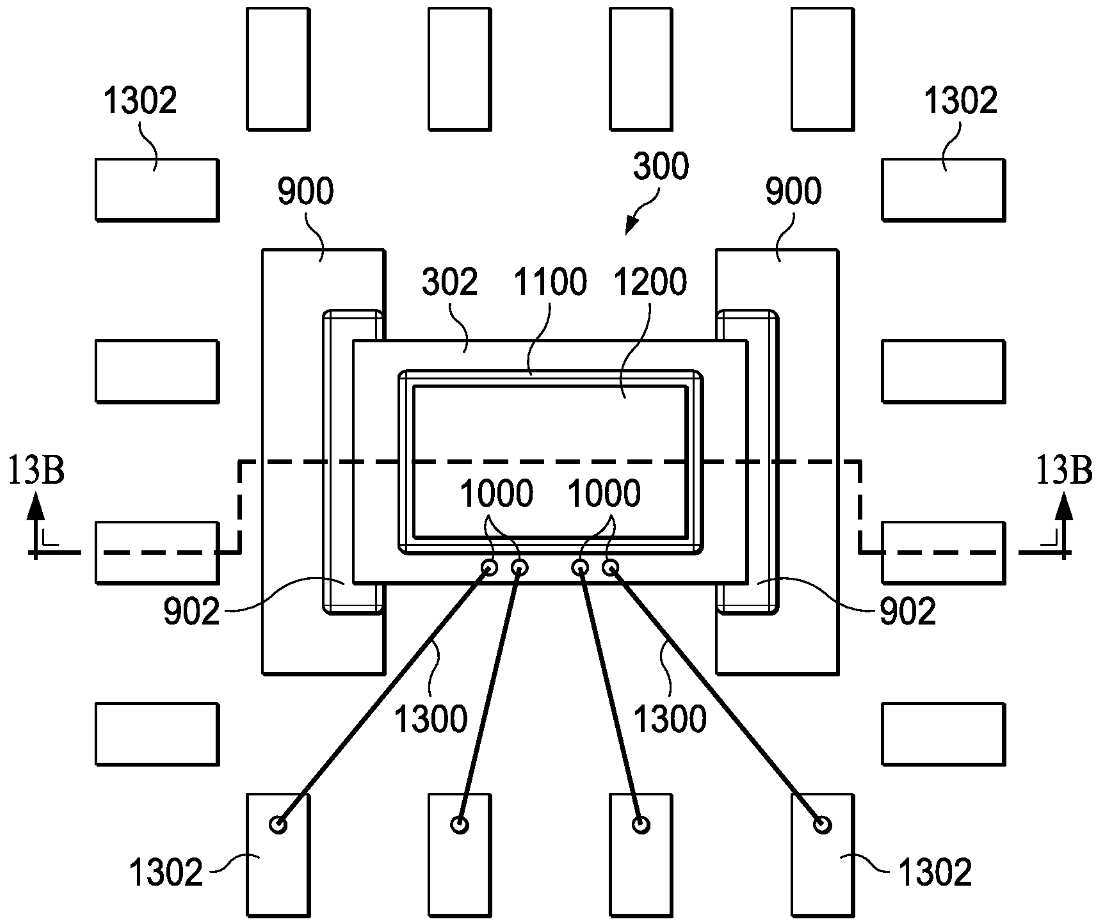
Figure 13B:
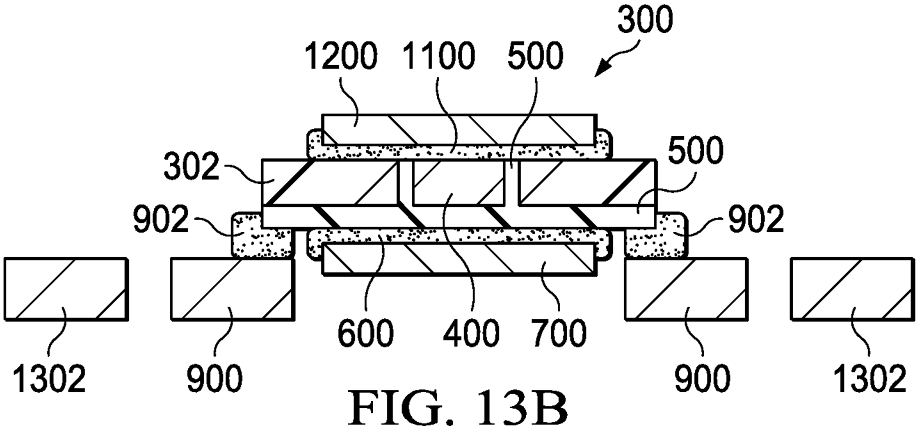
Figure 13C:
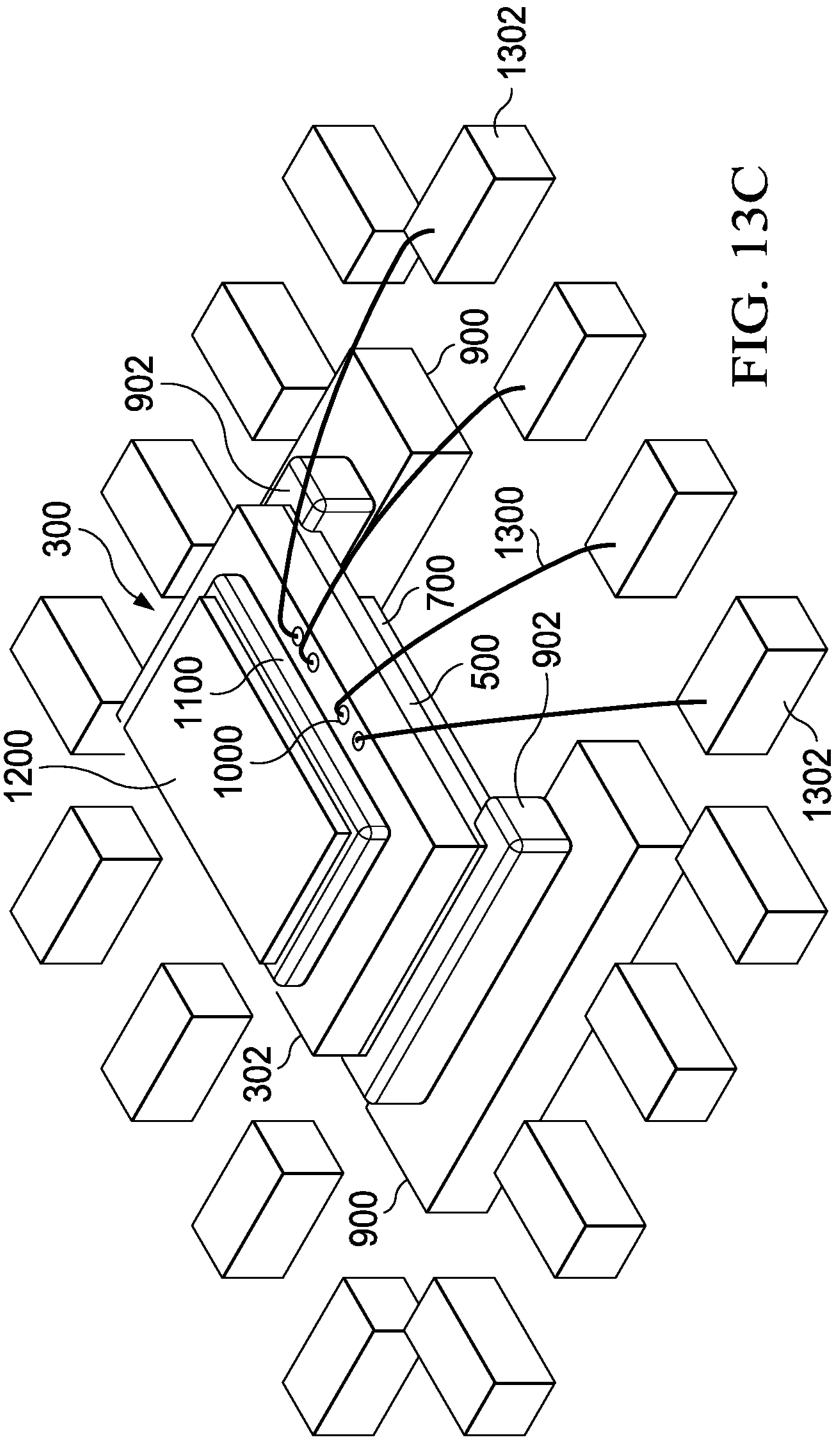

The method 200 then includes wire bonding the transformer coil terminals to conductive terminals, such as to the leads of the aforementioned lead frame (228). FIG. 13A depicts bond wires 1300 coupling the transformer coil terminals 1000 to conductive terminals 1302. FIG. 13B depicts a profile view of the structure of FIG. 13A, and FIG. 13C depicts a perspective view of the structures of FIGS. 13A and 13B.

Figure 14A:
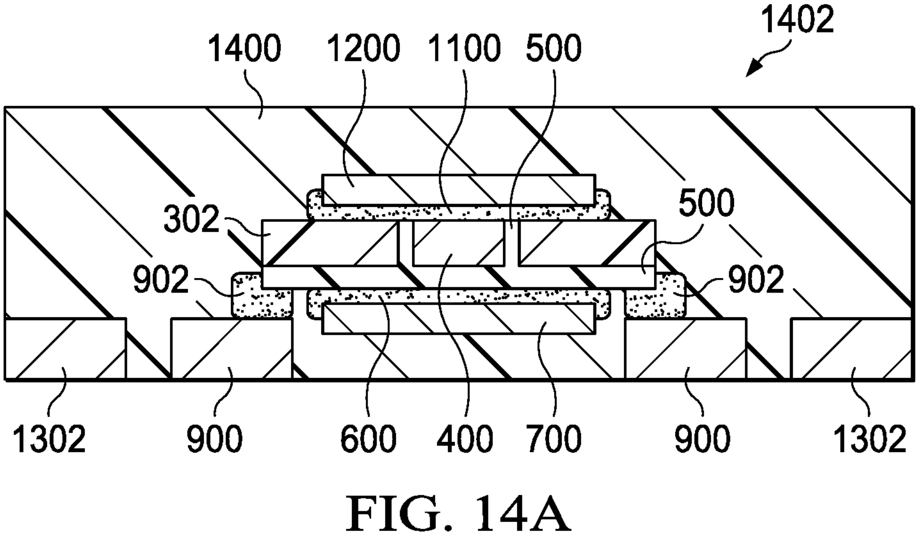
Figure 14B:
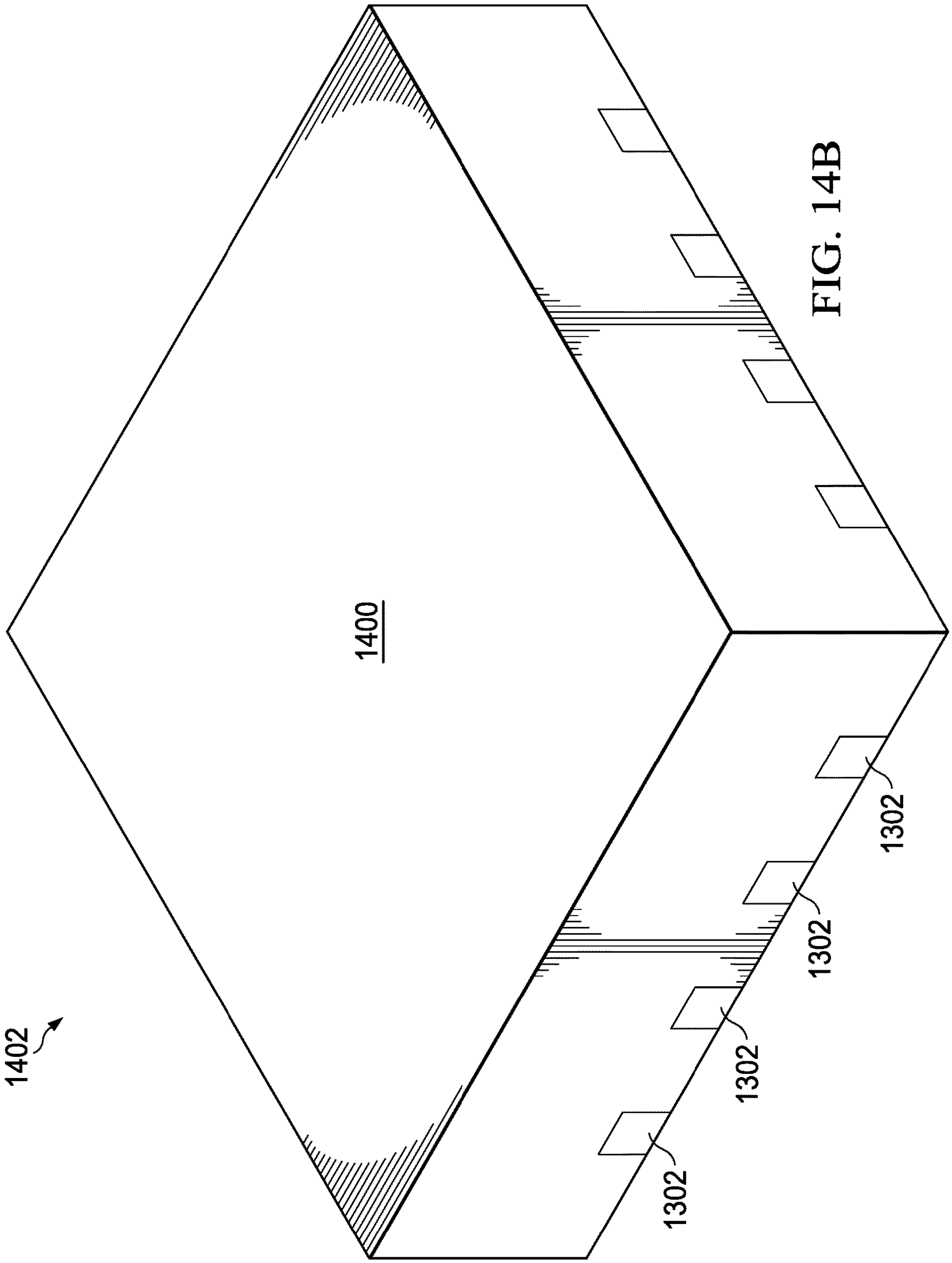

The method 200 subsequently comprises covering the structure of FIGS. 13A-13C with a mold compound (230). FIG. 14A depicts a profile view of the structure of FIGS. 13A-13C covered by a mold compound 1400 to produce a transformer device 1402. FIG. 14B depicts a perspective view of the transformer device 1402. The term transformer device is not limited specifically to the structure of FIGS. 14A and 14B, however. Instead, the term transformer device may be used to describe one or more of the other structures depicted and described herein.

The transformer device 1402 is able to provide the functionality of a transformer with greater reliability, efficiency, and longevity than other transformers. This is because the transformer device 1402 includes few or no of the air gaps described above. The method 200 and process flow depicted in FIGS. 3A-14B are able to mitigate the formation of air gaps in the insulation material, the adhesive layers, and the mold compound because they employ few or no geometries that promote air gap formation when viscous materials (e.g., adhesive material, mold compound) flow therethrough.

The process flow just described results in a transformer device 1402 in which the magnetic members 400, 700, and 1200 are physically separate from each other. This is in contrast to other transformer core structures, for example E-I structures, U-I structures, T-I structures, etc., in which each of the magnetic members is in contact with at least one other magnetic member. The physical separation of magnetic members, e.g., magnetic members 400, 700, and 1200, may be used to identify transformer devices that may have been produced using the process flow described above. The example structures of FIGS. 12A-14B are not obvious variations or mere design changes from other magnetic member combinations (e.g., E-I configurations, T-I configurations, etc.) at least because they are the results of novel processes, e.g., the novel process of method 200 in FIG. 2. Stated another way, performing the novel method 200 produces the example structures of FIGS. 12A-14B. Attempts to duplicate the example structures of FIGS. 12A-14B may fail if the specific steps of the method 200 are not performed. As merely one example, use of the tape 304 to position the magnetic member 400 in a desired position, the subsequent filling of the orifice 303 with insulation material 500, and the subsequent removal of the tape 304 facilitates the positioning of the magnetic member 400 in such a way that other magnetic members 700, 1200 may be kept physically separate from the magnetic member 400. Thus, merely attempting to rearrange magnetic members in, e.g., a typical E-I configuration to produce the novel structures described herein will both fail to produce the structures described herein and fail to mitigate the deleterious air gaps described above.

Figure 15:
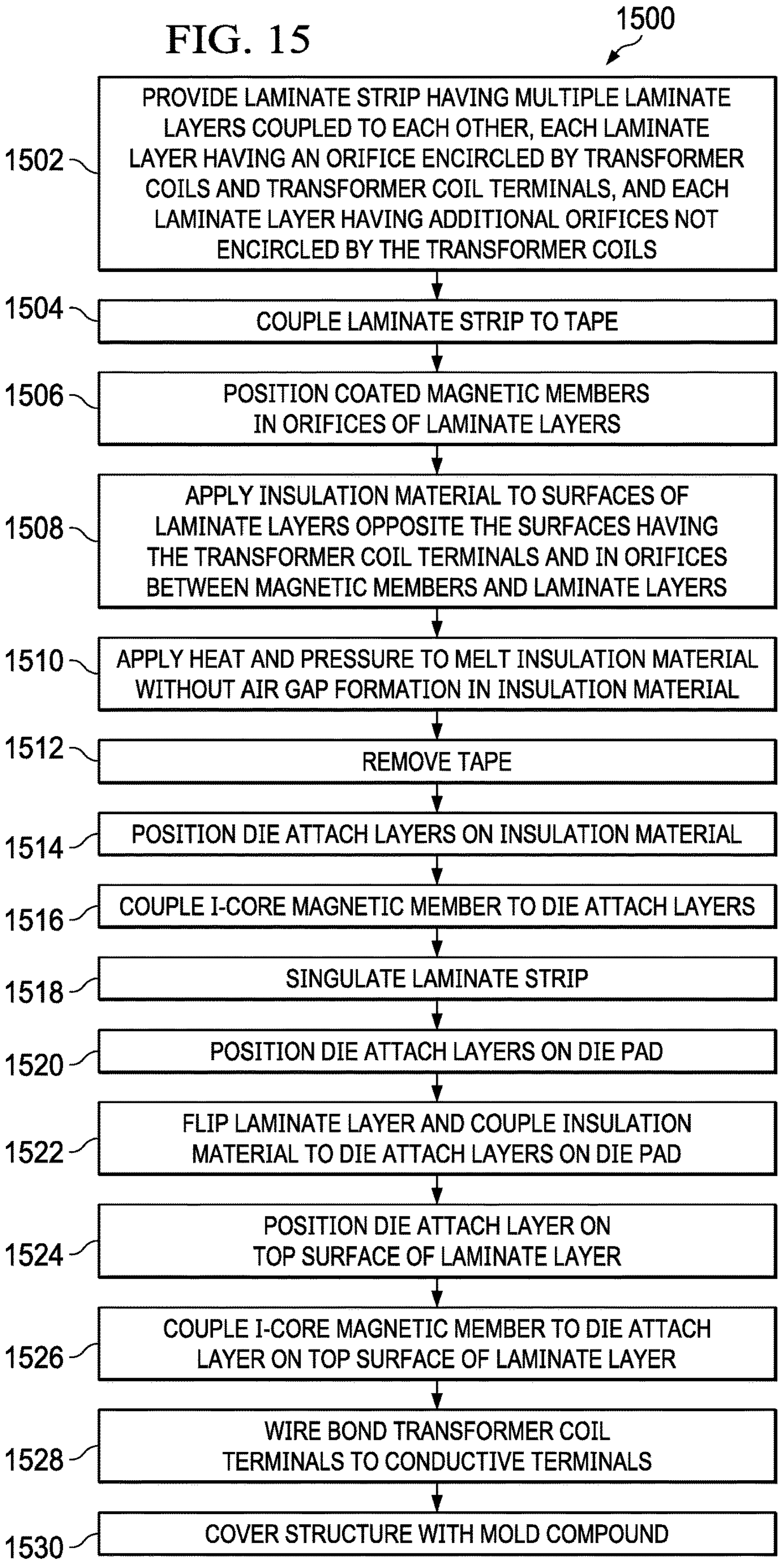
FIG. 15 is a flow diagram of a method for fabricating a transformer device, in accordance with various examples.

FIG. 15 is a flow diagram of a method 1500 for fabricating a transformer device, in accordance with various examples. FIGS. 16A-16C, 17A-17C, 18A-18C, 19A-19C, 20A-20C, 21A-21C, 22A-22C, 23A-23C, 24A-24C, 25A-25C, 26A-26C, 27A, and 27B depict profile, top-down, and perspective views of a process flow for fabricating a transformer device, in accordance with various examples. Accordingly, FIG. 15 is now described in tandem with the process flow of FIGS. 16A-27B.

Figure 16A:
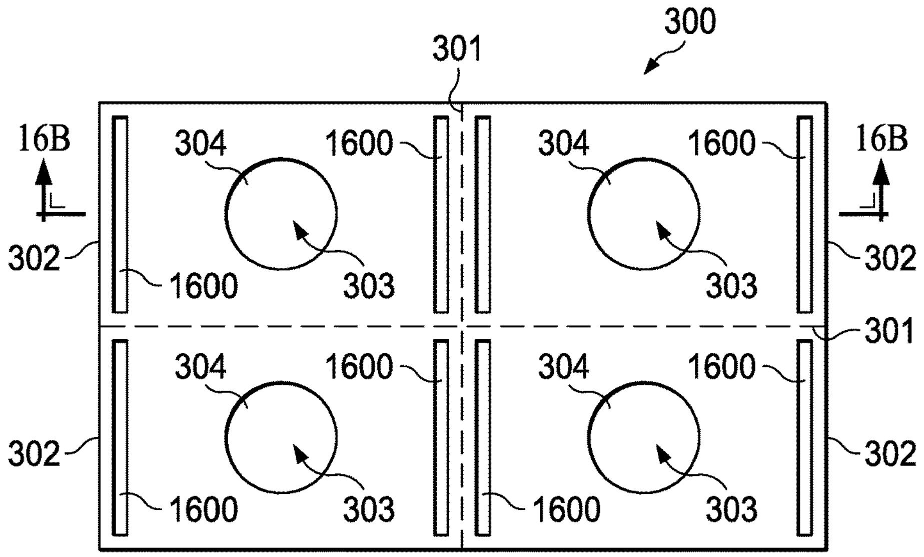
FIGS. 16A-16C, 17A-17C, 18A-18C, 19A-19C, 20A-20C, 21A-21C, 22A-22C, 23A-23C, 24A-24C, 25A-25C, 26A-26C, 27A, and 27B depict profile, top-down, and perspective views of a process flow for fabricating a transformer device, in accordance with various examples.
Figure 16B:
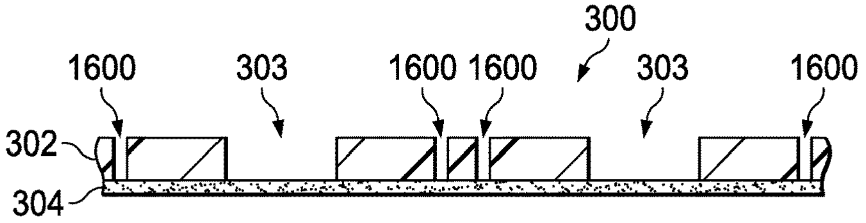
Figure 16C:
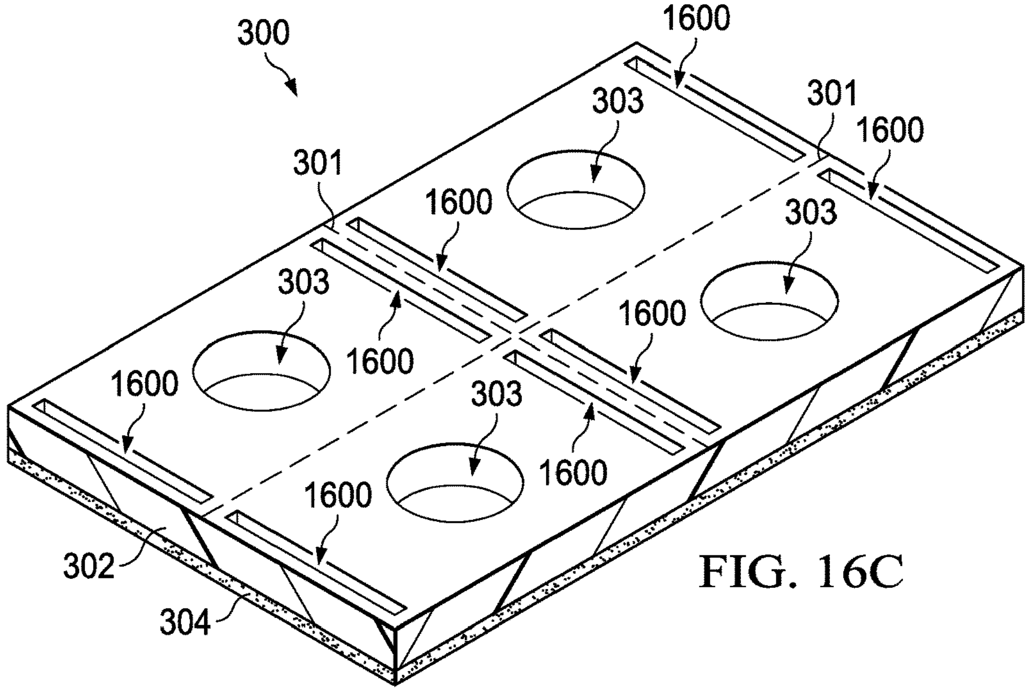

The method 1500 begins with providing a substrate strip having multiple substrate layers coupled to each other, with each substrate layer having an orifice encircled by transformer coils and having transformer coil terminals (1502). However, step 1502 of FIG. 15 differs from step 202 of FIG. 2 because in step 1502, each substrate layer has additional orifices not encircled by the transformer coils. FIG. 16A depicts such additional orifices 1600. Specifically, each substrate layer 302 has an orifice 303 that is encircled by transformer coils and multiple (e.g., two) orifices 1600 not encircled by transformer coils. In examples, each orifice 1600 has a length ranging from 200 microns to 5 millimeters, a width ranging from 120 microns to 150 microns, and a depth that depends on substrate layer thickness. FIG. 16B depicts a cross-sectional view of the structure of FIG. 16A, and FIG. 16C depicts a perspective view of the structures of FIGS. 16A and 16B.

The method 1500 comprises coupling the substrate strip to tape (1504). As FIGS. 16A-16C depict, tape 304 is coupled to the substrate strip 300.

Figure 17A:
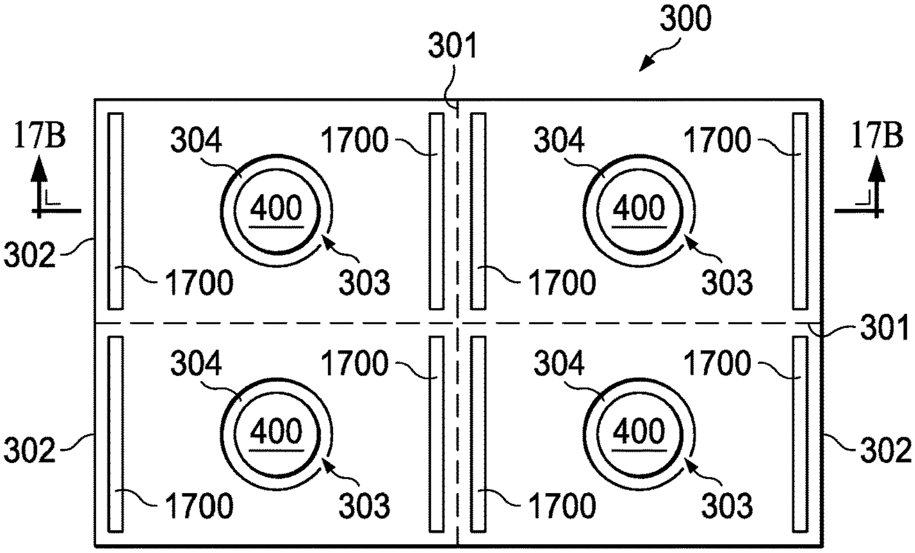
Figure 17B:
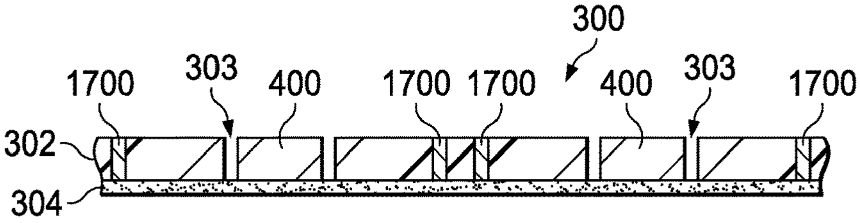
Figure 17C:
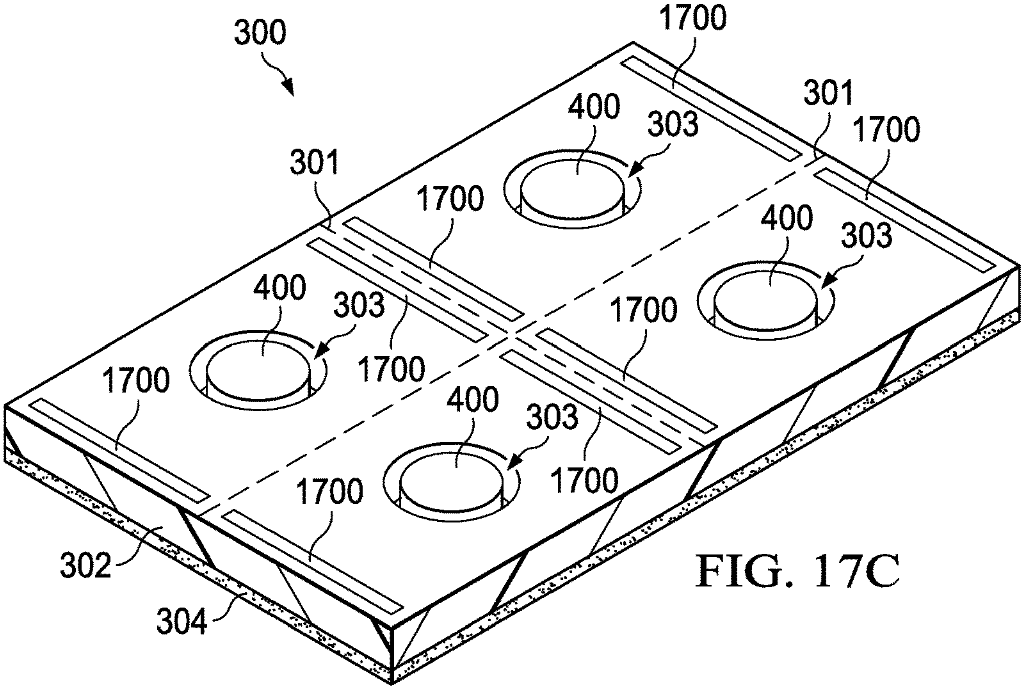
Figure 18A:
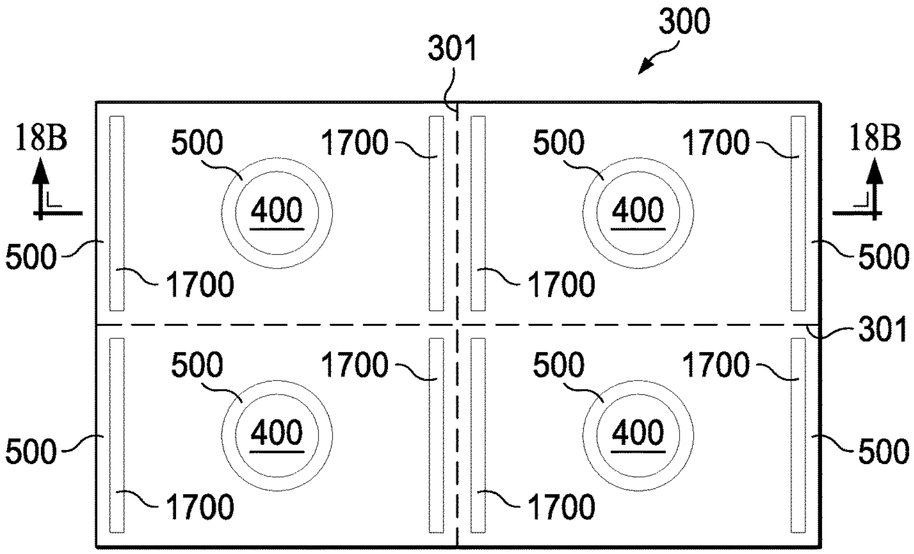
Figure 18B:
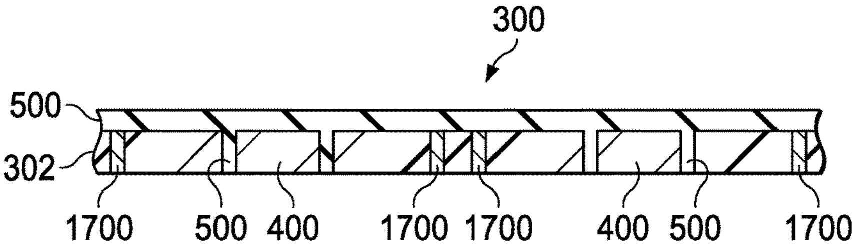
Figure 18C:
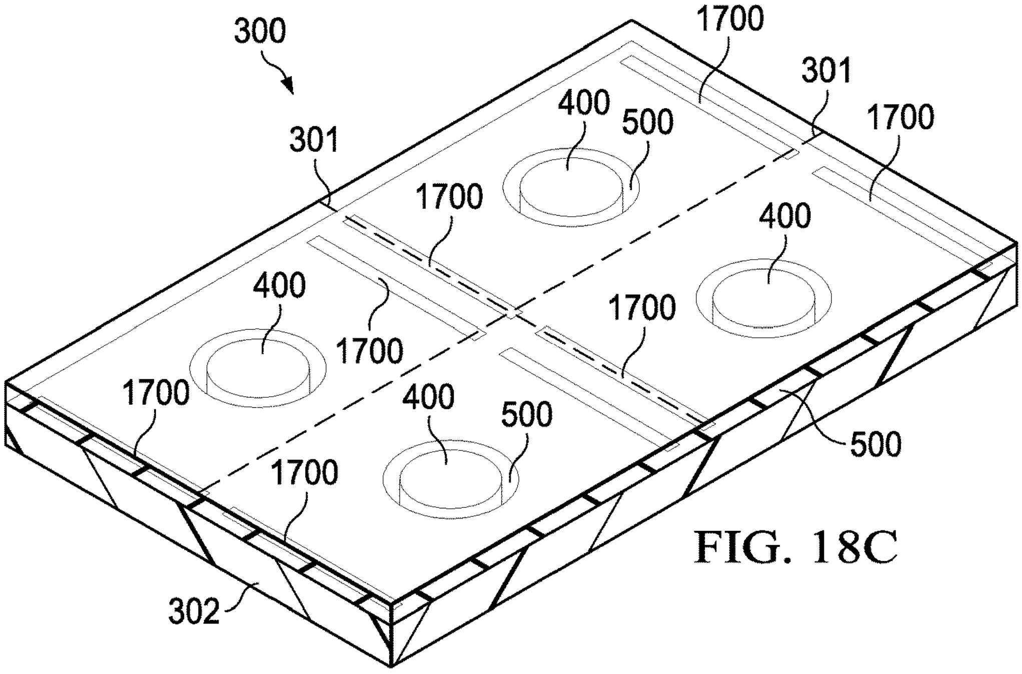
Figure 19A:
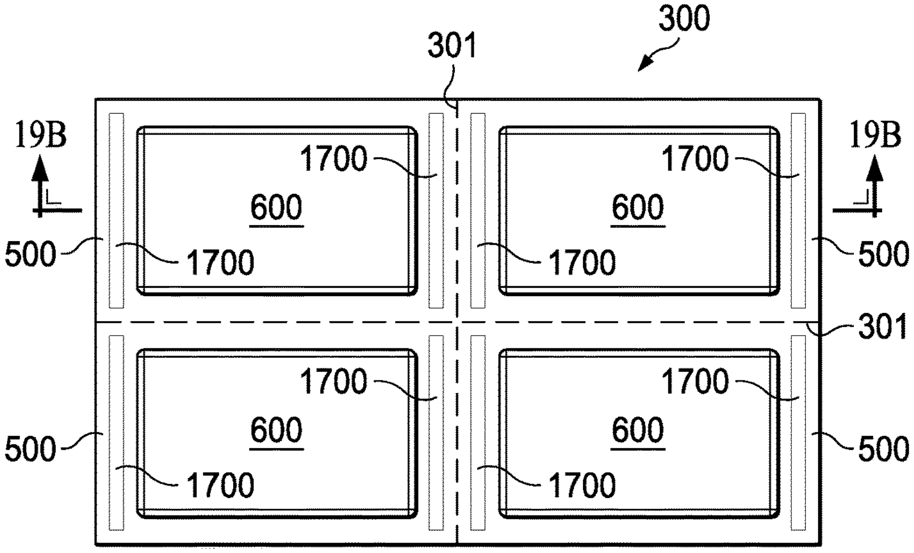
Figure 19B:
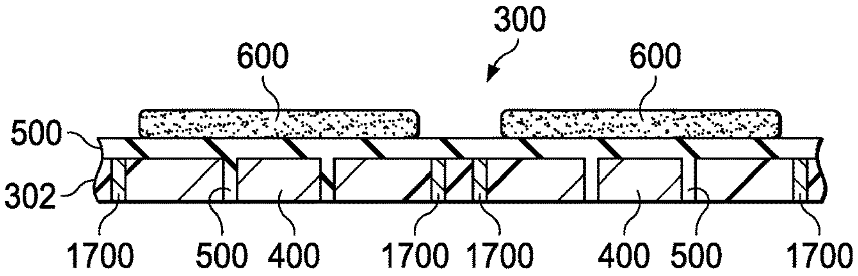
Figure 19C:
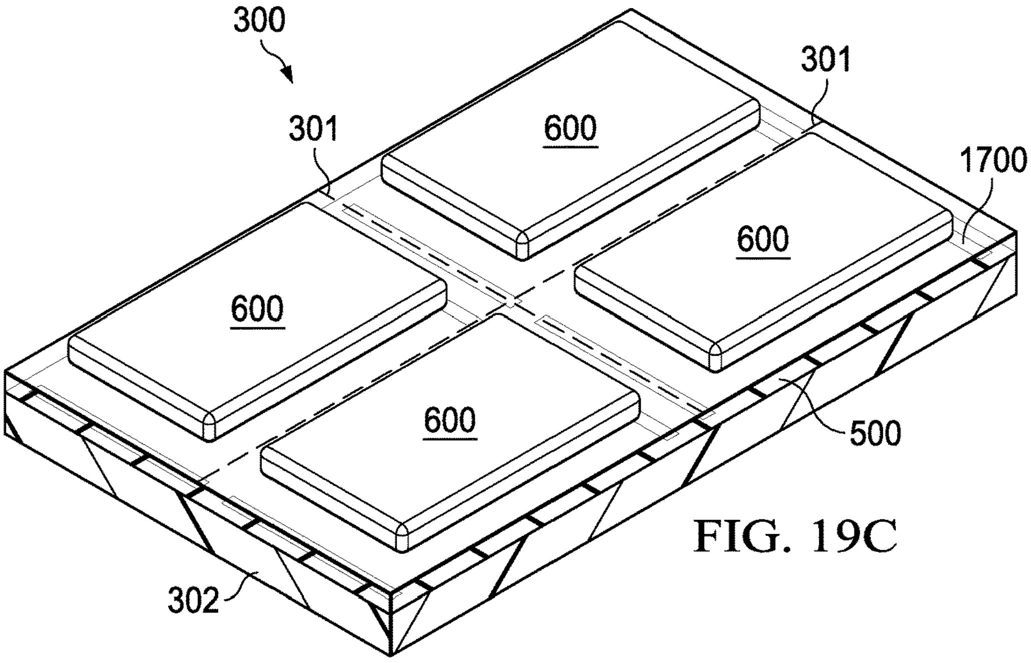
Figure 20A:
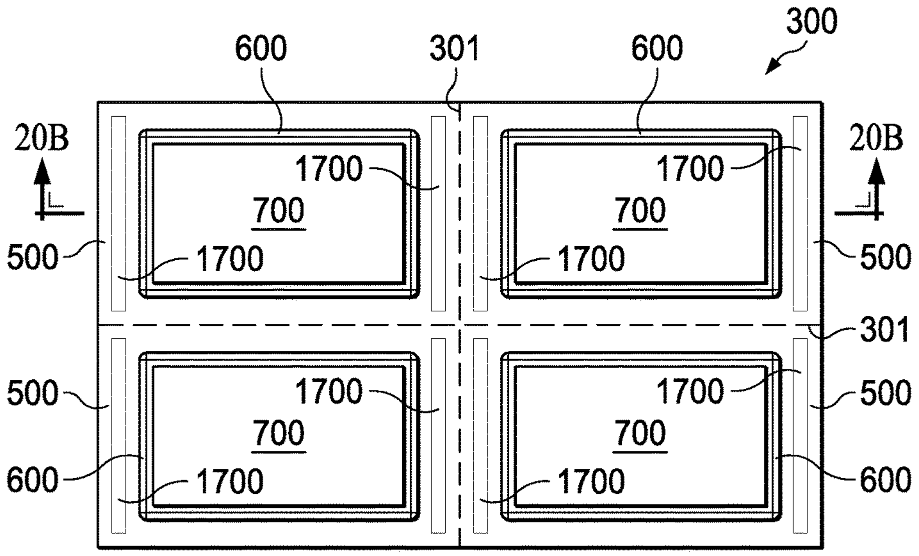
Figure 20B:
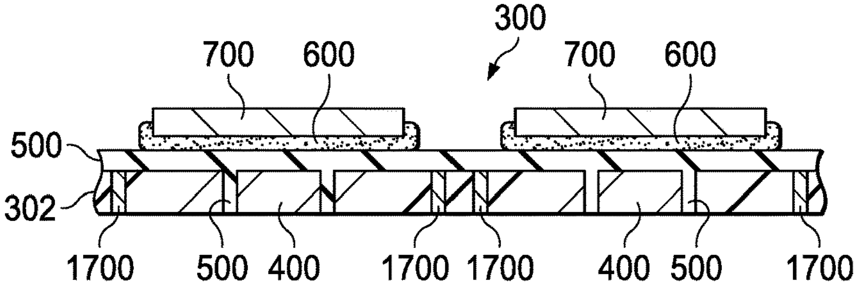
Figure 20C:
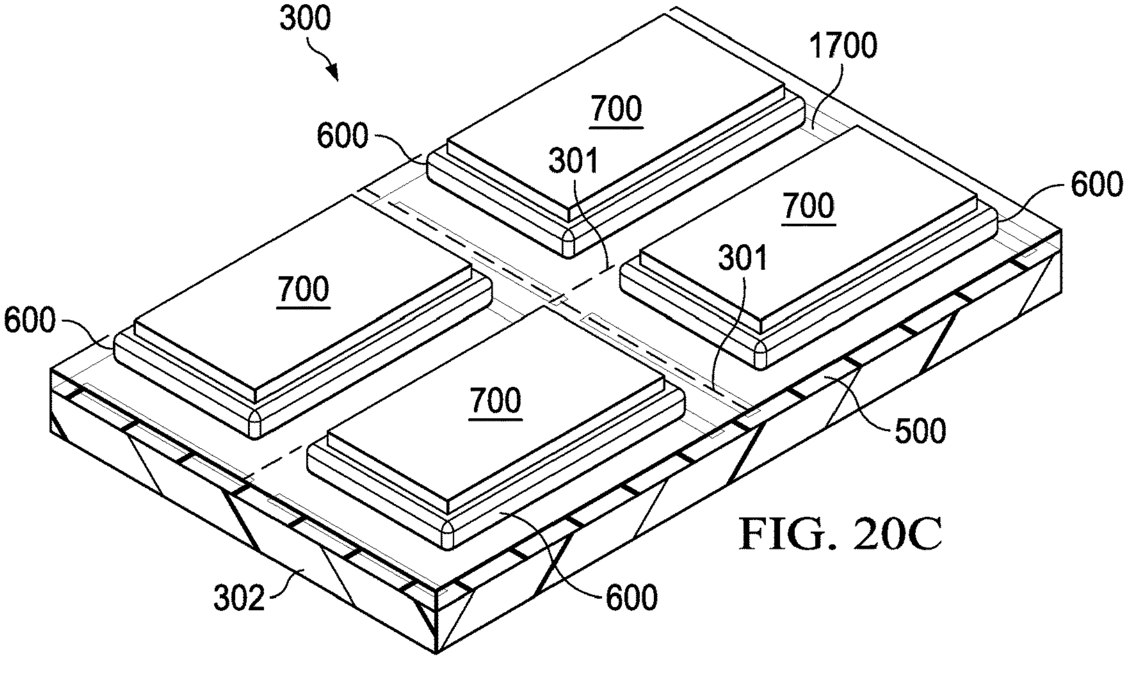
Figure 21A:
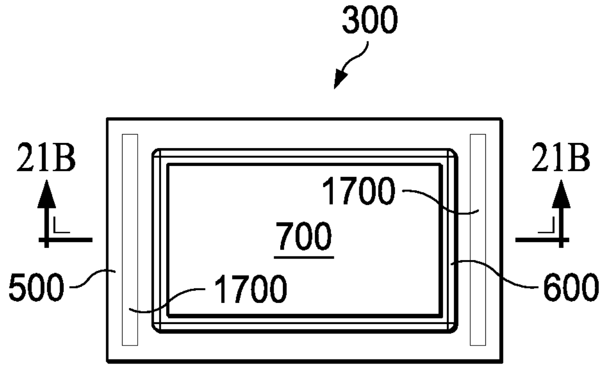
Figure 21B:
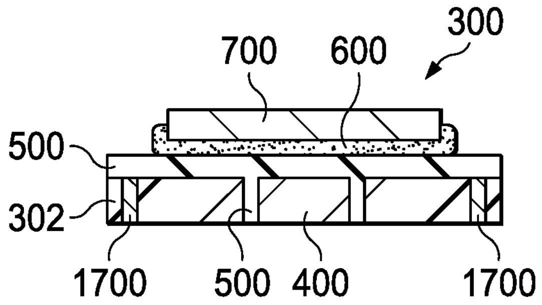
Figure 21C:
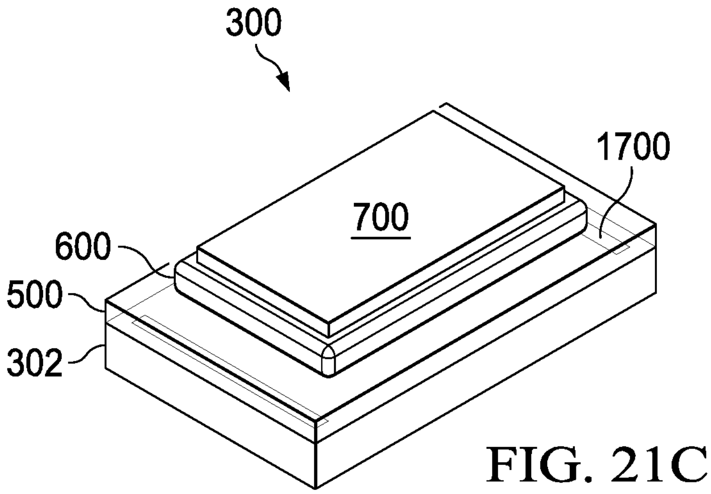
Figure 22A:
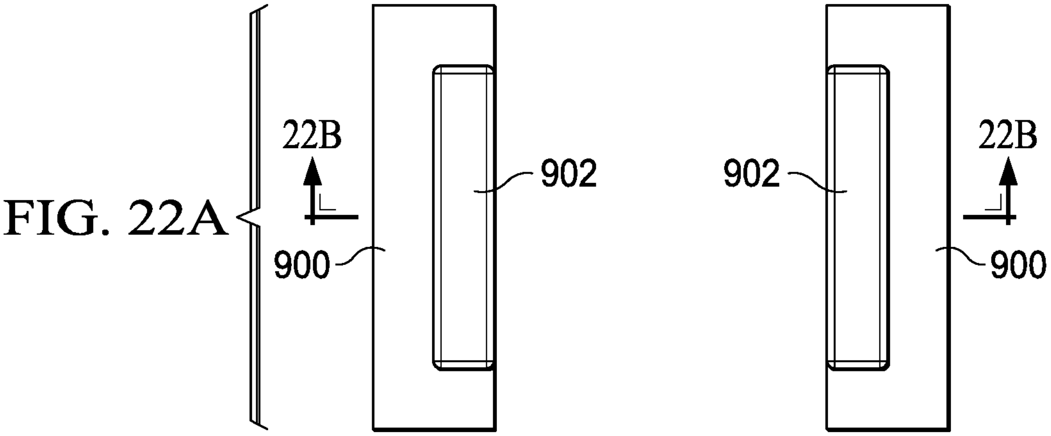
Figure 22B:
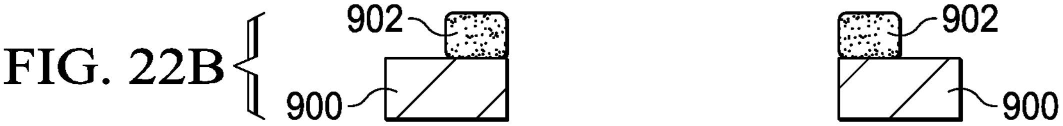
Figure 22C:
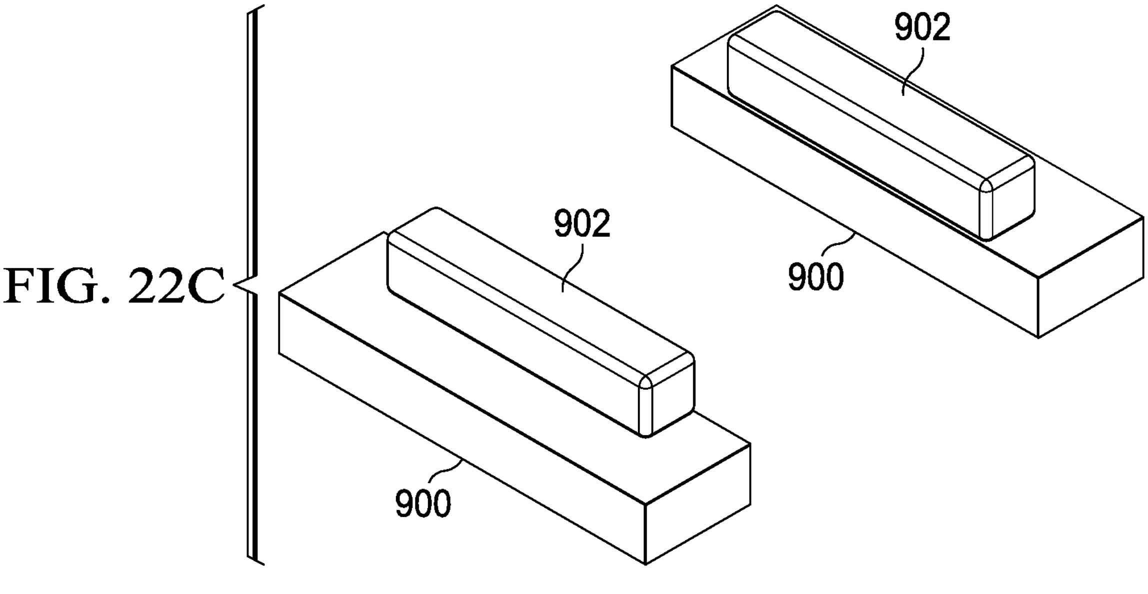
Figure 23A:
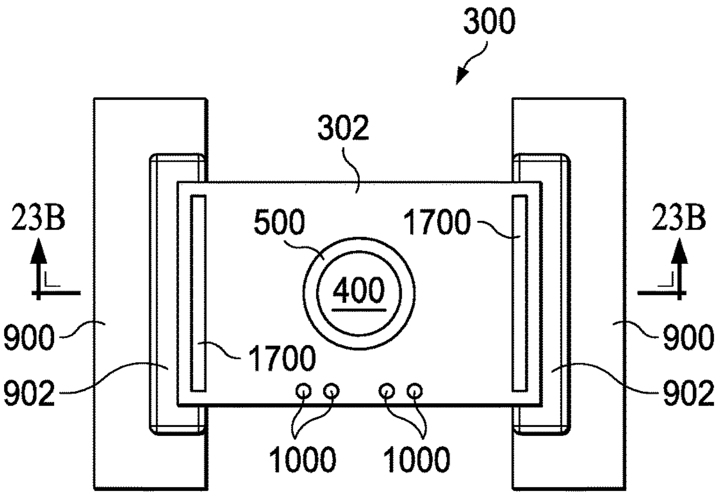
Figure 23B:
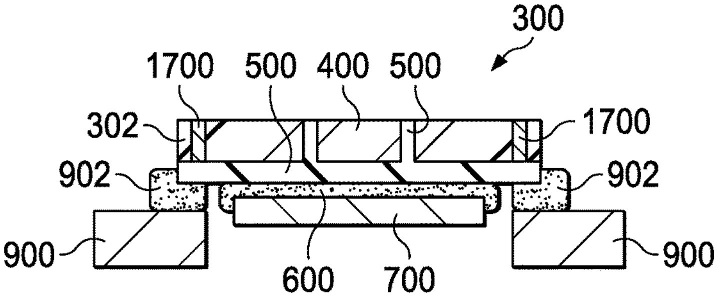
Figure 23C:
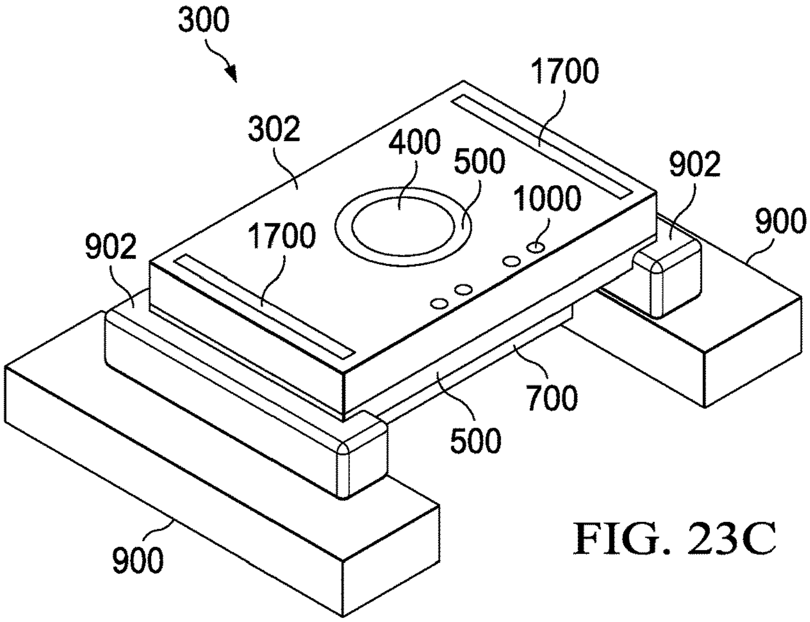
Figure 24A:
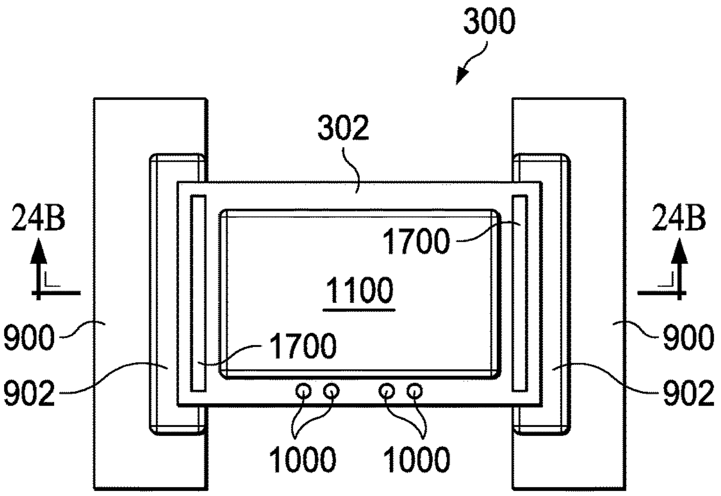
Figure 24B:
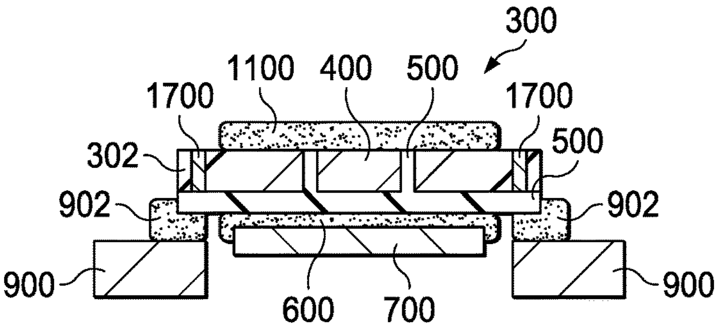
Figure 24C:
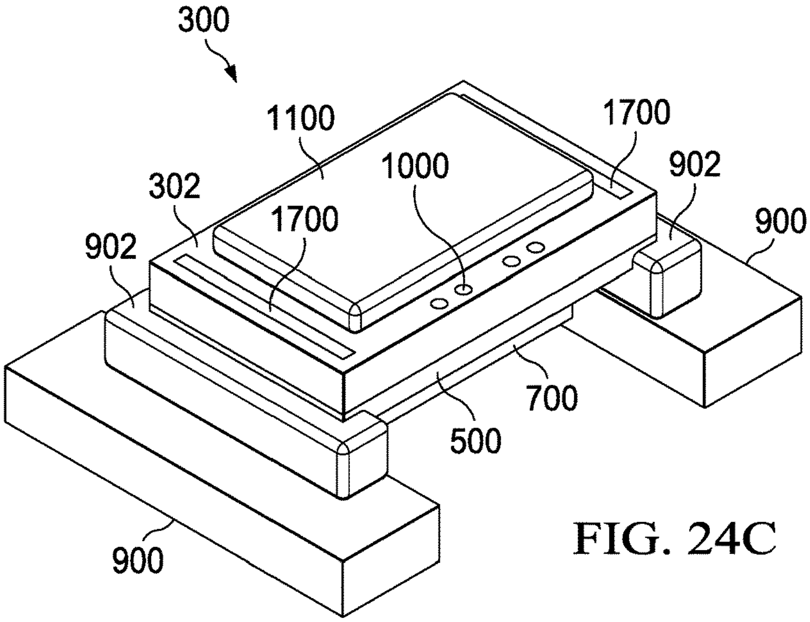
Figure 25A:
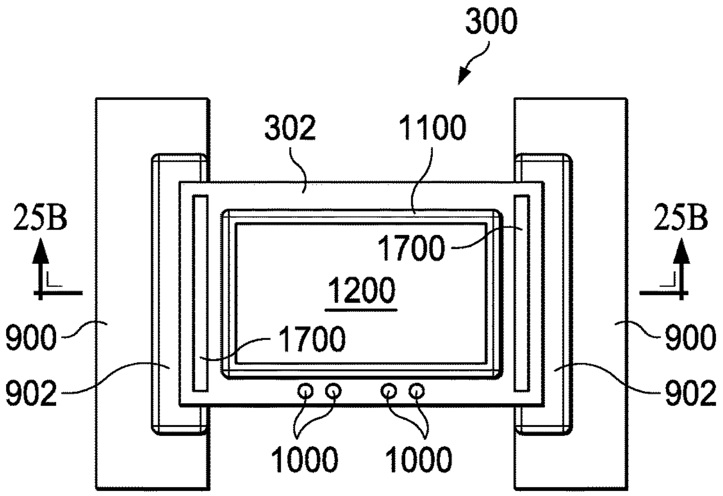
Figure 25B:
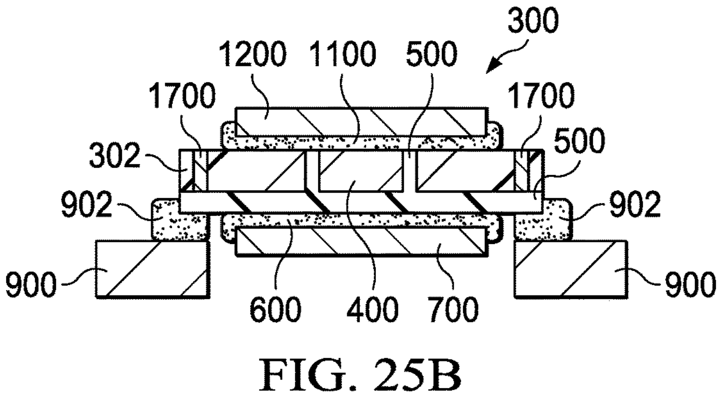
Figure 25C:
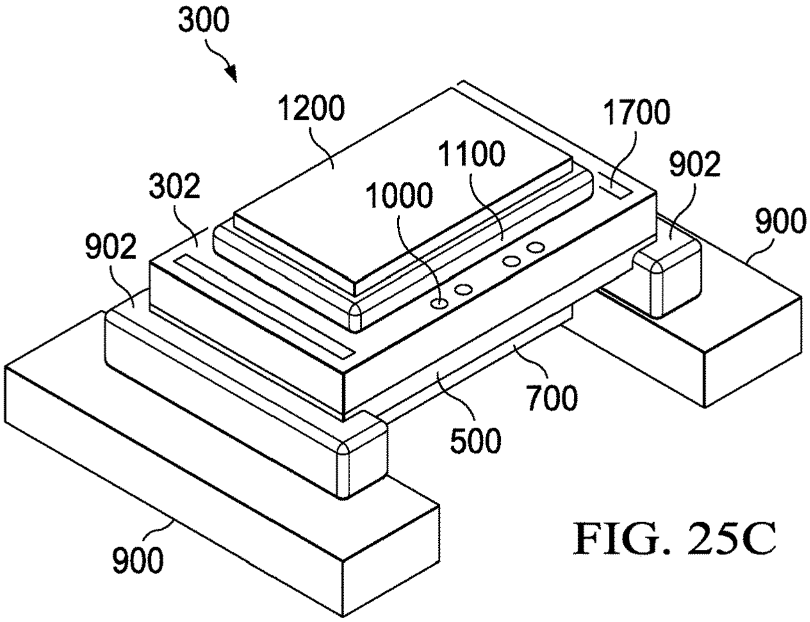
Figure 26A:
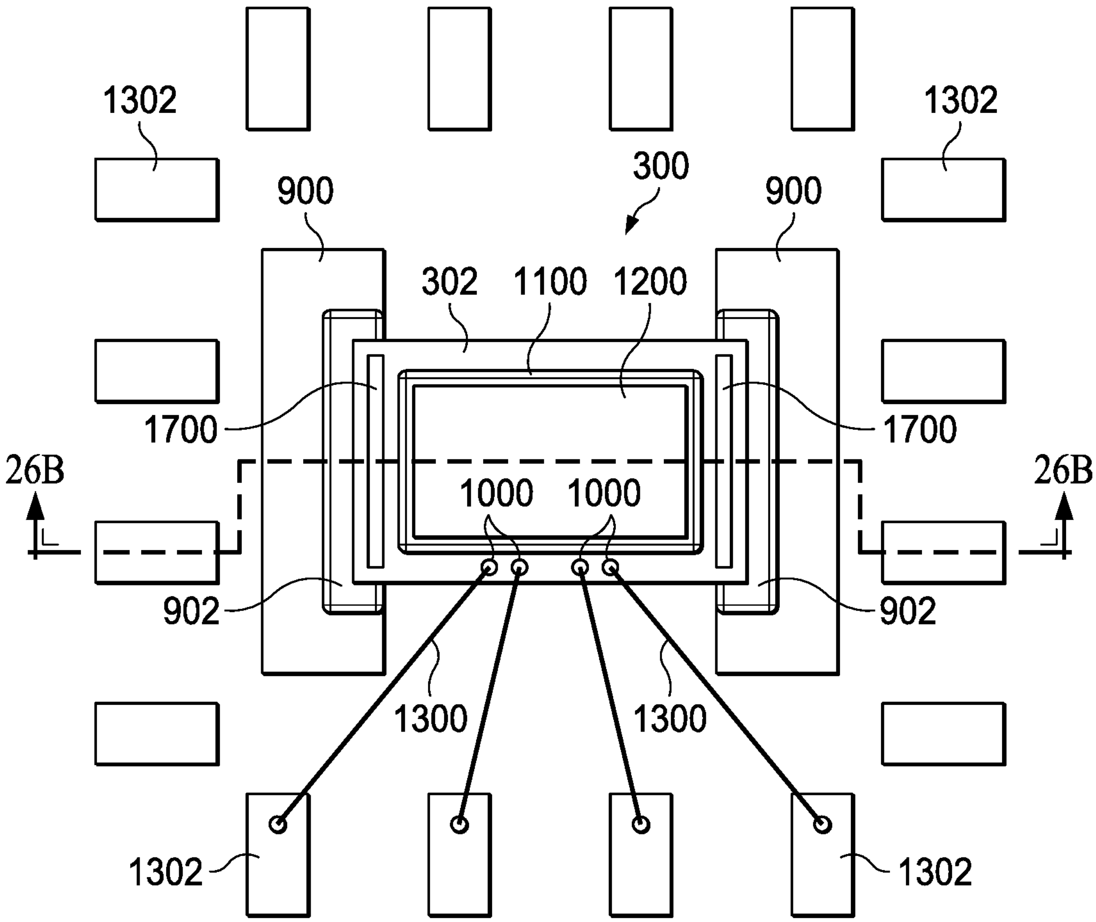
Figure 26B:
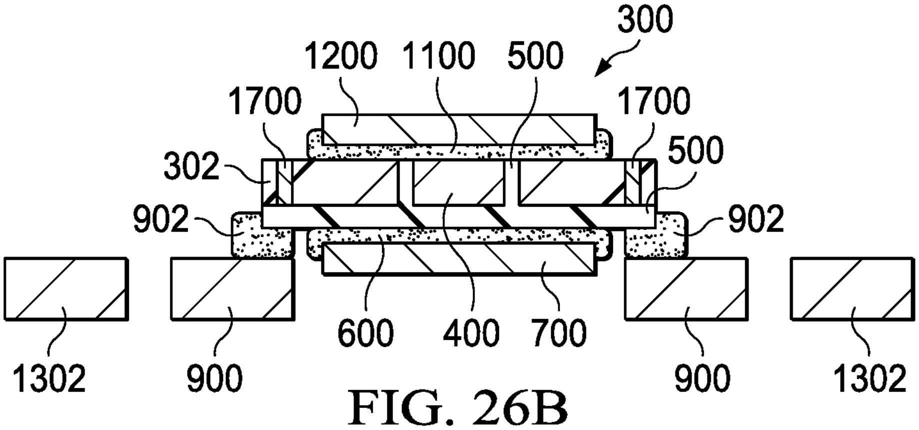
Figure 27A:
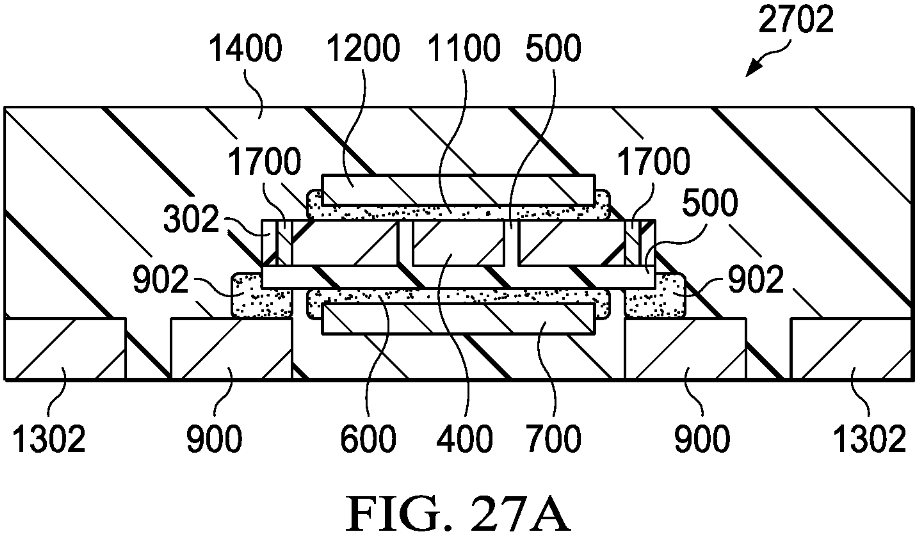
Figure 26C:
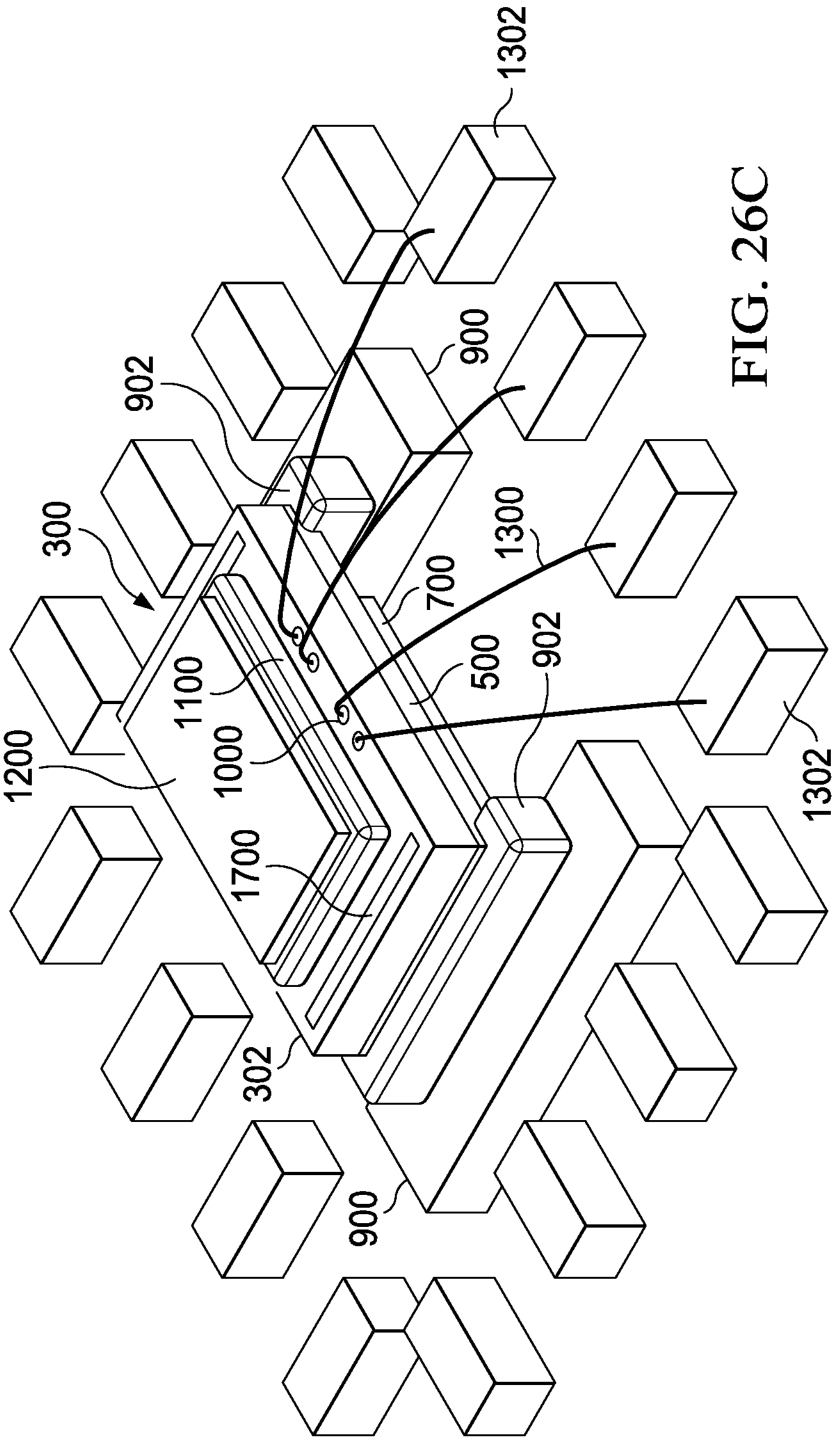
Figure 27B:
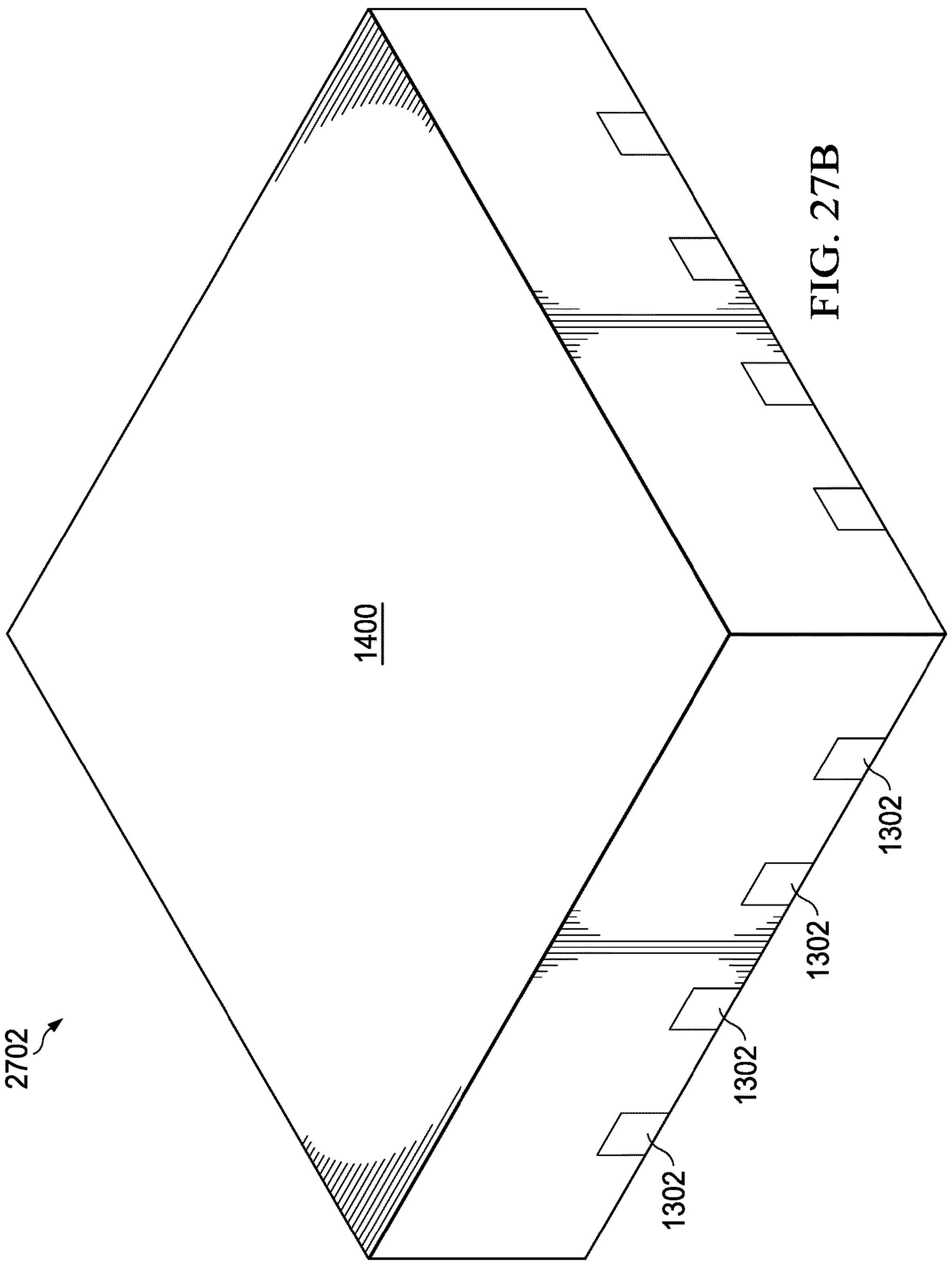

The method 1500 next comprises positioning coated magnetic members in orifices of substrate layers (1506). The step 1506 is the same as step 206, except that in step 1506, coated magnetic members 1700 are positioned inside the orifices 1600, as FIGS. 17A-17C depict. The coating applied to the magnetic members 1700 may have the same thickness and composition as the coating described above for, e.g., the magnetic members 400. In examples, each of the magnetic members 1700 may have a length ranging from 150 microns to 5 millimeters, a width ranging from 100 microns to 120 microns, and a thickness depending on substrate layer thickness, with larger magnetic members 1700 having the advantage of improved magnetic flux through closed structure and disadvantage of reduced coil (winding) area, and smaller magnetic members 1700 having the advantage of more coil turns and disadvantage of reduced magnetic flux through closed structure. The remaining steps 1508, 1510, 1512, 1514, 1516, 1518, 1520, 1522, 1524, 1526, 1528, and 1530 are the same as steps 208, 210, 212, 214, 216, 218, 220, 222, 224, 226, 228, and 230, respectively. Similarly, the steps of the process flow in FIGS. 18A-27B are the same as the steps of process flow in FIGS. 5A-14B, respectively. One advantage to having the additional magnetic members 1700 in the orifices 1600 is that the operation of the resulting transformer device 2702 (FIGS. 27A and 27B) has increased efficiency because a closed magnetic flux structure is formed. Similar to the transformer devices described above, the magnetic members of the transformer device 2702 are physically separate from each other, for example as depicted in FIG. 25B. In addition, the transformer device 2702 avoids or mitigates the problems described above relating to air gaps, since the insulation material, adhesive layers, and mold compound of the transformer device 2702 have few or no air gaps. The presence of air gaps is mitigated because of the lack of complex geometries through which viscous materials (e.g., insulation material, adhesive layers, mold compound) flow during manufacture.

Figure 28A:
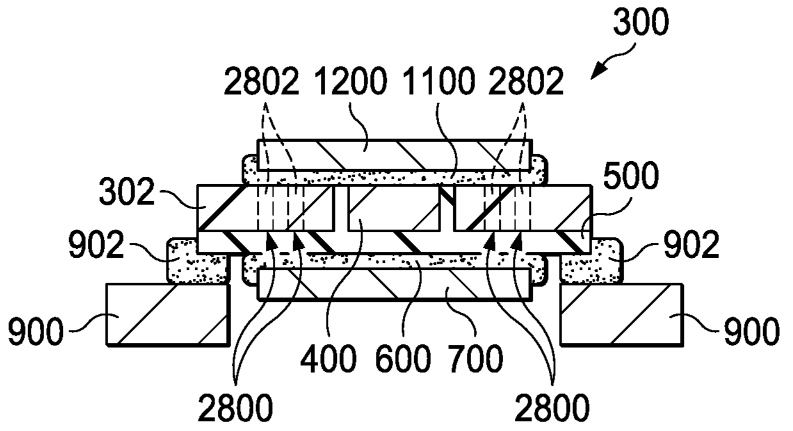
FIGS. 28A and 28B depict profile, top-down, and perspective views of a transformer device comprising vias, in accordance with various examples.
Figure 28B:
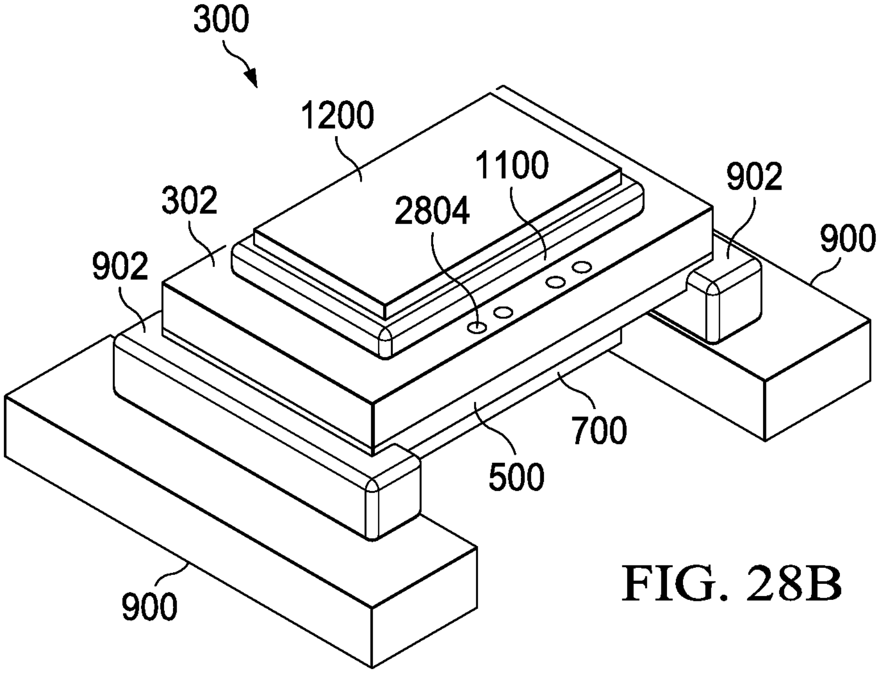
Figure 29A:
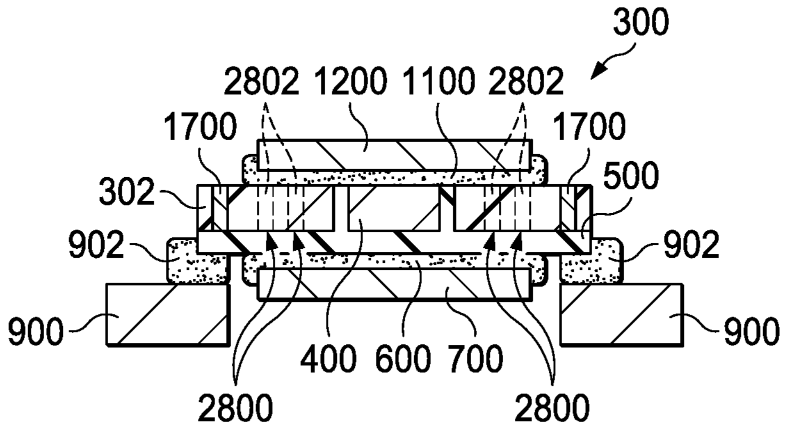
FIGS. 29A and 29B depict profile, top-down, and perspective views of a transformer device comprising vias, in accordance with various examples.
Figure 29B:
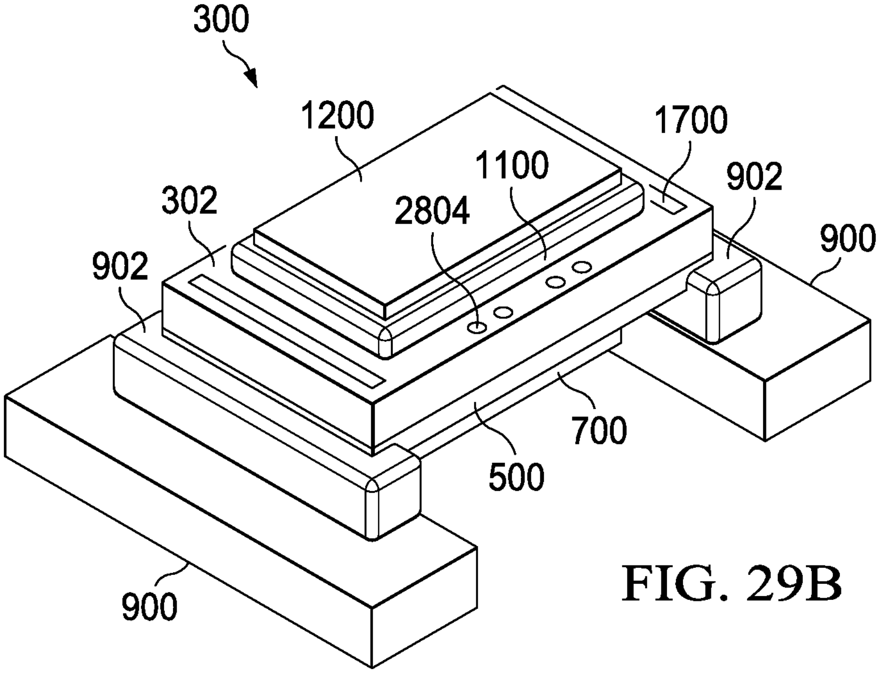

The process flows described above produce transformer devices 1402 and 2702 that have upward-facing transformer coil terminals 1000. This is because the process flows begin with the transformer coil terminals 1000 facing downward (e.g., FIGS. 3A and 16A), and a substrate layer flip occurs in FIGS. 10A and 23A. In examples, however, it may be desirable to employ process flows that begin with the transformer coil terminals 1000 facing upward. When such process flows are concluded, the transformer coil terminals 1000 would be facing downward due to the aforementioned substrate layer flip, thus potentially making the transformer coil terminals 1000 difficult to access for wirebonding purposes. In such cases, multiple vias may be formed through the substrate layer of the transformer device, with one end of each via positioned at a transformer coil terminal, and an opposite end of that via positioned at the surface of the substrate layer opposite the surface that has the transformer coil terminals. For example, FIG. 28A depicts a structure similar to that of FIG. 12B, except that it includes four vias 2800 extending through the thickness of the substrate layer 302. Although not expressly depicted, four transformer coil terminals (e.g., the transformer coil terminals 106, 110 of FIG. 1A) are positioned on the bottom surface of the substrate layer 302 where the vias 2800 coincide with the bottom surface of the substrate layer 302. In addition, although not expressly shown in FIG. 28A (but shown in FIG. 28B), four additional transformer coil terminals 2804 are positioned on the top surface of the substrate layer 302 where the vias 2800 coincide with the top surface of the substrate layer 302. The transformer coil terminals on the bottom and top surfaces of the substrate layer 302 couple to each other by way of conductive members 2802, which may, for example, be formed by electroplating. Similarly, the transformer coil terminals 2804 may be formed by electroplating. The sizes and compositions of the conductive members 2802 and the various transformer coil terminals may be selected as desired. The vias 2800, conductive members 2802, and transformer coil terminals 2804 may be formed at any suitable stage of the process flows described above. FIG. 28B depicts a perspective view of the structure of FIG. 28A. FIG. 29A is identical to FIG. 28A, except that it includes coated magnetic members 1700, for example as depicted in FIG. 25B and described above. FIG. 29B depicts a perspective view of the structure of FIG. 29A.

Figure 30:
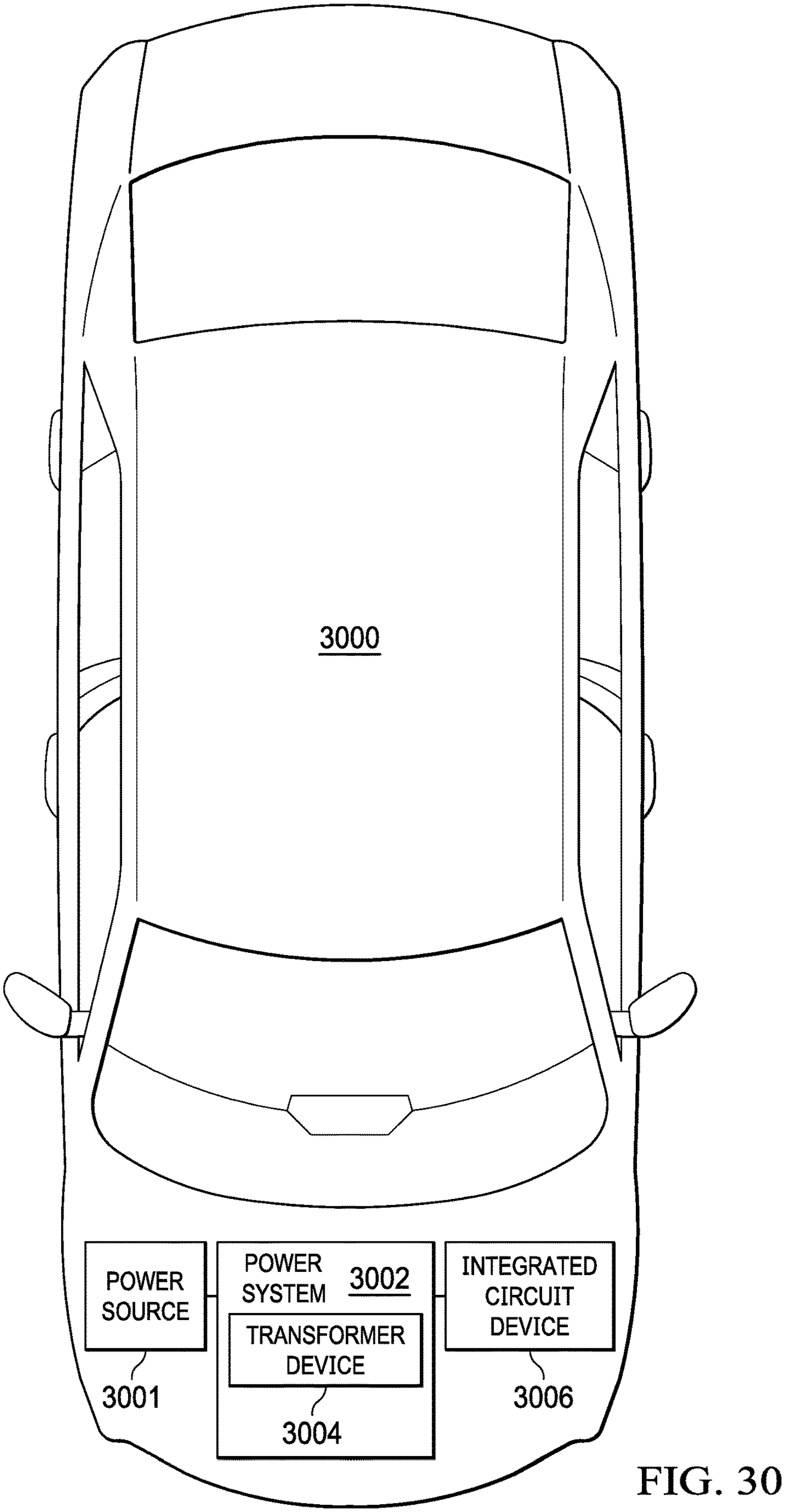
FIG. 30 is a top-down view of a system implementing a transformer device, in accordance with various examples.
Figure 31:
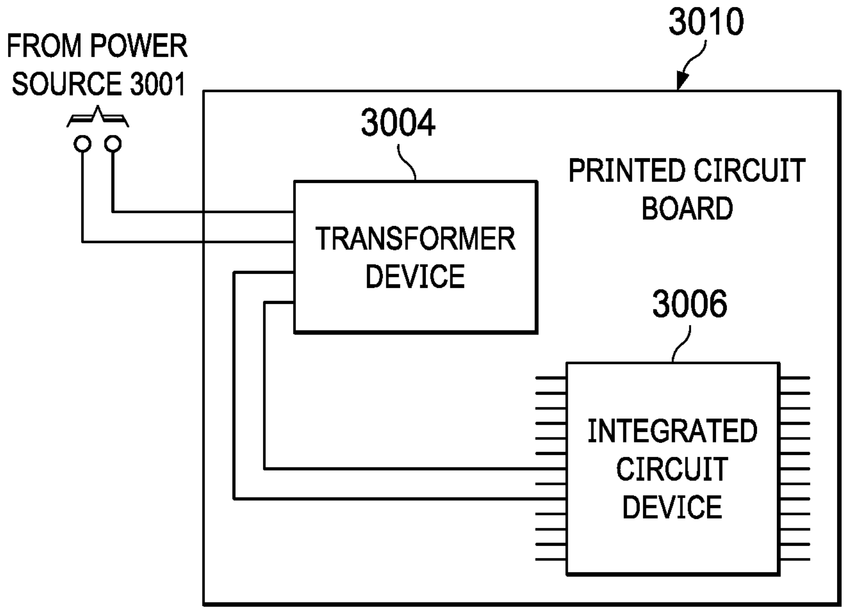
FIG. 31 depicts a printed circuit board (PCB) on which a transformer device and an integrated circuit (IC) device are mounted, in accordance with examples.

FIG. 30 depicts a system 3000, such as an automobile, although any of a variety of other systems are contemplated and included in the scope of this disclosure. The system 3000 may include a power source 3001 (e.g., a battery), a power system 3002 that implements a transformer device 3004 (e.g., the transformer devices 1402 (FIG. 14B), 2702 (FIG. 27B)), and an integrated circuit (IC) device 3006. The power source 3001 supplies power to the transformer device 3004, which, in turn, adjusts the power (e.g., by stepping down the voltage) to provide an appropriate level of power to the IC device 3006. The IC device 3006 may perform any of a variety of actions (e.g., dashboard electronics in the system 3000). FIG. 31 depicts an example printed circuit board (PCB) 3010 on which the transformer device 3004 and the IC device 3006 are mounted. The PCB 3010 may be inside the system 3000. The transformer device 3004 is, for example, a QFN package, such as that shown in FIG. 27B. The IC device 3006 is, for example, a dual-inline gullwing-style package (DIP). By providing an appropriate level of power to the IC device 3006, the transformer device 3004 enables the IC device 3006 to perform its operations.

In the foregoing discussion and in the claims, the terms "including" and "comprising" are used in an open-ended fashion, and thus mean "including, but not limited to . . . ." Also, the term "couple" or "couples" means either an indirect or direct connection. Thus, if a first device couples to a second device, that connection may be through a direct connection or through an indirect connection via other devices and connections. Similarly, a device that is coupled between a first component or location and a second component or location may be through a direct connection or through an indirect connection via other devices and connections. Unless otherwise stated, "about," "approximately," or "substantially" preceding a value means+/−10 percent of the stated value. The above discussion is illustrative of the principles and various embodiments of the present disclosure. Numerous variations and modifications will become apparent to those skilled in the art once the above disclosure is fully appreciated. The following claims should be interpreted to embrace all such variations and modifications.

What is claimed is:

1. A transformer device comprising:

a first magnetic member;

a second magnetic member;

a substrate layer between the first and second magnetic members, the substrate layer comprising a transformer coil, the transformer coil including an edge exposed on a surface of the substrate layer, the edge electrically coupled to a lead of the transformer device via a bond wire; and a third magnetic member inside the substrate layer, the transformer coil encircling the third magnetic member, the third magnetic member physically separate from the first and second magnetic members, wherein a first surface of the third magnetic member is coplanar with a first surface of the substrate layer, and wherein a second surface of the third magnetic member is not coplanar with a second surface of the substrate layer; and wherein an insulation material in an orifice of the substrate layer contacts the third magnetic member.

2. The transformer device of claim 1, wherein the third magnetic member is in the orifice of the substrate layer.

3. The transformer device of claim 1, wherein the substrate layer includes a laminate material encircling the third magnetic member.

4. The transformer device of claim 1, wherein the insulation material is between the third magnetic member and the first magnetic member.

5. The transformer device of claim 1, further comprising a first adhesive layer between the third magnetic member and the first magnetic member.

6. The transformer device of claim 5, wherein the first adhesive layer abuts an insulation material.

7. The transformer device of claim 5, further comprising a second adhesive layer between the third magnetic member and the second magnetic member.

8. The transformer device of claim 1, wherein the first and second magnetic members comprise I-core magnetic members.

9. A transformer device comprising:

a first I-core magnetic member;

a first adhesive layer coupled to the first I-core magnetic member;

insulation material coupled to the first adhesive layer;

a substrate layer coupled to the insulation material and having a transformer coil, the transformer coil including an edge exposed on a surface of the substrate layer;

a magnetic member encircled by the transformer coil;

a second adhesive layer coupled to the substrate layer; and a second I-core magnetic member coupled to the second adhesive layer, wherein the magnetic member is physically separate from the first and second I-core magnetic members, wherein a surface of the magnetic member is coplanar with the surface of the substrate layer.

10. The transformer device of claim 9, wherein the insulation material is between the magnetic member and the substrate layer.

11. The transformer device of claim 9, wherein the insulation material is between the magnetic member and the first I-core magnetic member.

12. The transformer device of claim 9, further comprising a second magnetic member in the substrate layer, the second magnetic member not encircled by the transformer coil.

13. The transformer device of claim 9, wherein the magnetic member has a thickness that is within plus or minus 5% of a thickness of the substrate layer.

14. The transformer device of claim 13, wherein the thickness of the magnetic member ranges from 200 micrometers to 400 micrometers.

15. The transformer device of claim 9, further comprising a mold compound abutting the first and second I-core magnetic members, the first and second adhesive layers, the insulation material, and the substrate layer.

16. A transformer device comprising:

a first magnetic member;

a second magnetic member;

a substrate layer between the first and second magnetic members, the substrate layer comprising a transformer coil, a laminate material, and an insulation material contacting the laminate material; and a third magnetic member inside the substrate layer and in between the laminate material, the transformer coil encircling the third magnetic member.

17. The transformer device of claim 16, wherein the third magnetic member is in an orifice of the substrate layer.

18. The transformer device of claim 17, wherein the insulation material abuts the third magnetic member and that is in the orifice of the substrate layer.

19. The transformer device of claim 18, wherein the insulation material is between the third magnetic member and the first magnetic member, and wherein the insulation material is in between the third magnetic member and the laminate material.

* * * * *